(12) United States Patent
Wu et al.

(10) Patent No.: US 12,046,028 B1
(45) Date of Patent: Jul. 23, 2024

(54) COMPILER SYSTEM FOR DEPLOYING CNN MODELS TO FPGA-BASED HIGH-PERFORMANCE ACCELERATORS

(71) Applicant: Northeastern University, Shenyang (CN)

(72) Inventors: Gang Wu, Shenyang (CN); Yongzheng Chen, Shenyang (CN); Shuaibo Yin, Shenyang (CN)

(73) Assignee: NORTHEASTERN UNIVERSITY, Shenyang (CN)

( * ) Notice: Subject to any disclaimer, the term of this patent is extended or adjusted under 35 U.S.C. 154(b) by 0 days.

(21) Appl. No.: 18/409,832

(22) Filed: Jan. 11, 2024

(30) Foreign Application Priority Data

Mar. 23, 2023 (CN) .......................... 202310288488.1

(51) Int. Cl.
*G06V 10/82* (2022.01)
*G06V 10/94* (2022.01)

(52) U.S. Cl.
CPC ............ *G06V 10/82* (2022.01); *G06V 10/955* (2022.01)

(58) Field of Classification Search
CPC .............................. G06V 10/82; G06V 10/955
See application file for complete search history.

(56) References Cited

U.S. PATENT DOCUMENTS

| | | | | |
|---|---|---|---|---|
| 11,562,220 B2* | 1/2023 | Park | .................. | G06N 3/084 |
| 11,782,729 B2* | 10/2023 | Grohoski | .............. | G06F 9/5016 |
| | | | | 713/100 |
| 11,861,337 B2* | 1/2024 | Chang | .................. | G06F 8/41 |
| 2018/0341495 A1* | 11/2018 | Culurciello | ........... | G06F 9/3895 |
| 2020/0175396 A1* | 6/2020 | Boyce | .................. | G06T 1/20 |
| 2020/0225996 A1* | 7/2020 | Sharma | ............... | G06F 15/7889 |
| 2021/0319369 A1* | 10/2021 | Nimmagadda | ........ | G06N 3/105 |

(Continued)

FOREIGN PATENT DOCUMENTS

WO  WO-2021257703 A1 * 12/2021 ........... G06F 13/382

OTHER PUBLICATIONS

Dhilleswararao, Pudi, et al. "Efficient hardware architectures for accelerating deep neural networks: Survey." IEEE access 10 (2022) : 131788-131828. (Year: 2022).*

(Continued)

*Primary Examiner* — Utpal D Shah
(74) *Attorney, Agent, or Firm* — Bayramoglu Law Offices LLC

(57) ABSTRACT

A compiler system for deploying CNN models to FPGA-based high-performance accelerators is provided. The compiler system comprises a compiler front end and a compiler back end, as well as a runtime library and an accelerator; the compiler front end is used for the quantization of CNN models to be deployed based on the ONNX model and a training data set, and the IR Graph corresponding to the CNN model to be deployed is obtained; the compiler back end is used to determine instructions and configuration information; the instruction set architecture comprises CONY, MAXP, AVGP, ADD and FC, and the configuration information comprises pre-trained weights and bias, packet descriptors and key-value pairs representing control registers; the runtime library is used to store instructions and configuration files to DRAM, and FPGA is configured according to the configuration information of the model.

8 Claims, 24 Drawing Sheets

(56) References Cited

U.S. PATENT DOCUMENTS

| | | | |
|---|---|---|---|
| 2022/0066760 A1* | 3/2022 | Chang | G06N 3/063 |
| 2023/0004775 A1* | 1/2023 | Bourge | G06N 3/105 |
| 2023/0082952 A1* | 3/2023 | Kim | G06N 3/063 |
| | | | 706/43 |
| 2024/0054609 A1* | 2/2024 | Huang | G06T 7/10 |

OTHER PUBLICATIONS

Qian, Jiadong, Zhongcheng Huang, and Lingli Wang. "A Compiler Design for a Programmable CNN Accelerator." 2020 China Semiconductor Technology International Conference (CSTIC). IEEE, 2020. (Year: 2020).*

Plagwitz, Patrick, et al. "A safari through FPGA-based neural network compilation and design automation flows." 2021 IEEE 29th Annual International Symposium on Field-Programmable Custom Computing Machines (FCCM). IEEE, 2021. (Year: 2021).*

\* cited by examiner

COMPILER SYSTEM FOR DEPLOYING CNN MODELS TO FPGA-BASED HIGH-PERFORMANCE ACCELERATORS

CROSS-REFERENCE TO THE RELATED APPLICATIONS

This application is based upon and claims priority to Chinese Patent Application No. 202310288488.1, filed on Mar. 23, 2023, the entire contents of which are incorporated herein by reference.

TECHNICAL FIELD this invention involves the application field of convolutional neural network technology accelerators, in particular a compiler system for deploying CNN models to FPGA-based high-performance accelerators.

BACKGROUND

Convolutional neural network (CNN) models have been widely used in many tasks, such as image classification and object detection. The dedicated hardware accelerator is more suitable for the large number of computational operations involved in CNN model inference tasks. The field programmable gate array (FPGA) has become an excellent accelerator hardware platform due to its high parallelism and low power consumption. However, the long development cycle and the wide range of software and hardware knowledge required greatly hinder the development and application of FPGA-based accelerators. Therefore, recent research has focused on designing compiler software that automatically maps CNN models to FPGAs, but has introduced new challenges.

On the one hand, modern CNN models derive many topologies and can be trained and derived from various deep learning frameworks. A flexible compiler should be able to handle this possibility. However, most of the existing designs are specific to specific frameworks or custom intermediate representations. Although some studies have developed tools for each deep learning framework to transform the model into an intermediate representation (IR) specified by the compiler, those tools must be frequently upgraded to keep up with the new version of the framework. Therefore, more flexible and convenient solutions need to be proposed.

On the other hand, it still has room for improvements in maximizing the performance of the FPGA accelerators. From the perspective of parallel strategy, since modern CNN models have convolution kernels of different shapes, accelerators using convolution kernel-level parallelism may have performance degradation. From the perspective of memory management, since the on-chip memory resources of modern FPGAs are large enough to cache intermediate results, the performance of accelerators that do not make good use of rich memory may not be optimal. In addition, the computing resources of modern FPGAs can run at higher clock frequencies, which provides more opportunities to improve overall throughput. Therefore, it is necessary to develop new parallel strategies, memory management algorithms, and hardware architectures for FPGA accelerators.

SUMMARY this invention provides a compiler system for deploying CNN models to FPGA-based high-performance accelerators, which can provide new parallel strategies, memory management algorithms, and hardware architectures for FPGA accelerators.

The technical solution of this invention is a compiler system for deploying CNN models to FPGA-based high-performance accelerators, comprising a compiler front end and a compiler back end, as well as an FPGA-based runtime library and an accelerator;

the compiler front end is used for a quantization of CNN models to be deployed based on an ONNX model and a training data set, and an IR Graph corresponding to the CNN model to be deployed is obtained;

the compiler back end is used to determine instructions and configuration information corresponding to the CNN model to be deployed according to the IR Graph, and the instructions and configuration information are saved to hex files;

an instruction set architecture comprises CONY, MAXP, AVGP, ADD and FC, and the configuration information comprises pre-trained weights and bias, packet descriptors and key-value pairs representing control registers;

the runtime library is used to store instructions and configuration files to DRAM, and FPGA is configured according to the configuration information of the model;

a convolution engine uses an im2col algorithm to transform convolution operations into matrix multiplications, and uses a fully-pipelined systolic array to accelerate these multiplications.

The compiler front end comprises a quantization parameter calculation unit and a quantization parameter verification unit;

the quantization parameter calculation unit is used to calculate quantization parameters for each layer of an input ONNX model, and parameters are determined by analyzing value ranges of weight and activation tensors that are obtained by running a batch of inference tasks on the training data set;

the quantization parameter verification unit is used to evaluate an accuracy of a quantized model by simulating hardware behaviors on CPUs, and the verification unit will iteratively optimize quantization parameters to meet a preset accuracy;

The compiler back end comprises an instruction generation unit and a static data determination unit;

the instruction generation unit takes as input the quantized model from the front end and is used to generate instruction sequence for different accelerator configurations;

the static data determination unit is used to determine static data for the accelerator according to the quantized model and deserialize to files with hex format;

the static data comprises pre-trained weight and bias tensors, the packet descriptors, and instruction sequences.

an on-chip buffers comprise RTM, CWM, BM, IM, and XPHM;

the RTM is used to store three-dimensional activation tensors for convolution and pooling operations, and one-dimensional vectors for fully-connected layers.

the CWM is used to store weight tensors for convolution operations;

the BM is used to store the bias for both convolutional layers and fully-connected layers;

the IM is used to store the instructions corresponding to the CNN model to be deployed;

the XPHM is used to store packet descriptors for convolutional and pooling layers.

The RTM comprises four independent storage blocks, each of which has a data bit width of 256 bits and can store 32 pixels with int8 precision;

the RTM has two storage mode, T-mode and V-mode, with the T-mode for storing three-dimensional tensors and the V-mode for one-dimensional vectors.

when the three-dimensional tensor needs to be stored in T-mode, placing a two-dimensional feature map in each storage block in sequence according to a channel order; for the two-dimensional feature map, after the pixels of the two-dimensional feature map are expanded into one-dimensional vectors, and arranging one-dimensional vectors in the corresponding storage blocks in turn, if a number of tensor channels of the two-dimensional feature map is not a multiple of 4, the compiler will automatically fill the number of tensor channels to a multiple of 4;

when the one-dimensional vector needs to be stored in the V-mode, elements of the vector are divided into segments and stored in RTM in turn, each segment contains 64 pixels and occupies two storage blocks; if a vector length of the one-dimensional vector is not a multiple of 64, the compiler will automatically fill the pixels to a multiple of 64.

The CWM comprises a static segment storage area and a dynamic segment storage area with adjacent settings;

the static segment storage area is used to store the weight tensors that are pre-loaded before running inference;

the dynamic segment storage area is used to cache weight tensors that are loaded from DRAM during the inference;

moreover, the dynamic segment storage area controls an access to the dynamic segment storage area through a double pointer mechanism;

a dynamic segment rd_ptr represents an address of a next expected data;

a dynamic segment wr_ptr represents a maximum address of a current valid data, the dynamic segment wr_ptr moves to a low address of the dynamic segment storage after configuring the static segment storage area or at the beginning of a convolution instruction, the dynamic segment wr_ptr will be updated when the convolution weight arrives;

if an entry of the dynamic segment storage area needs to be read, it should be satisfied that the dynamic segment wr_ptr is greater than the dynamic segment rd_ptr.

A scalable hardware module, X-bus is also developed to implement an im2col algorithm on-chip;

the X-bus comprises a packet generator and several filters;

the packet generator is used to read the three-dimensional tensor from the RTM and recombine the three-dimensional tensor into a virtual feature map matrix with a column vector of length Q, and organize pixel data in the virtual feature map matrix into data packets;

each data packet is composed of a packet descriptor and several payloads;

the packet descriptor contains four fields, comprising X_a_, len_per_chan, win_x, and win_y; where X_a_ and len_per_chan are a starting address and a length of the data packet in a virtual feature map, respectively, and win_x and win_y are positions of a sliding window corresponding to the data packet;

the payloads carry the pixel data and follow the packet descriptor;

the filters receive and cache data packets, and set Command Z, Command X, and Command E to describe a behavior of caching access, and use a cache read pointer rd_ptr to describe a current access state;

Command Z has no operands, it represents four zero elements, which can be processed directly without reading the cache;

Command X is used to indicate a reading of four pixels, the operands comprise shift and b_, shift represents a number of steps that need to be moved to locate the entry of rd_ptr where data in the cache is located, and b_ represents an address offset of the data in the entry;

Command E is used to end an access to a current packet and move rd_ptr to a next packet header.

The fully-pipelined systolic array is connected to the FSM of the X-bus through FIFO to realize a back pressure mechanism;

each filter provides a stall_req signal to the packet generator, when any stall_req signal is raised, the packet generator will stop a current transmission by placing invalid entries on the X-bus until no stop request asserted.

The convolution engine also comprises a synchronizer;

the synchronizer is used to deal with a synchronization relationship of the fully-pipelined systolic array;

a feature map row vector and a convolution weight column vector of the systolic array are from XFIFO and WFIFO, respectively, a row vector of XFIFO is written by FSM;

after a decoding of an instruction is completed, the engine starts to read the weight column vector immediately by a processor from the CWM and writing it to WFIFO, if a required weight entry has not been loaded into the CWM, the process will be blocked, the process will continue to execute until the required weight entry is loaded;

in each clock cycle, if the row vector and the column vector in XFIFO and WFIFO already exist, the synchronizer will read the row vector and the column vector simultaneously and provide them to the systolic array, otherwise the synchronizer will provide a 0 vector for the systolic array;

in a backpressure mechanism, outputs from the systolic array are buffered in the YFIFO, and a feedback signal will be sent to the synchronizer when the YFIFO is going to be full, which causes the synchronizer to stop reading input vectors from XFIFO and WFIFO and send 0 vectors to the systolic array.

The system uses a high-speed fully-pipelined systolic array of M rows and P columns to accelerate matrix multiplications and reduces a number of duty cycles through workload scheduling, vector reordering, and asynchronous processing;

workload scheduling: a matrix multiplication $M_x \times M_w$ obtained by an im2col transformation of convolution is divided into small workloads; in a process of the workload scheduling, first, fixing a $M_x$ submatrix, traversing all Mw submatrices, and then processing the next $M_x$ submatrix until all processing is completed;

vector reordering: storage format of tensors in RTM ensures that the pixels at the same position in four consecutive channels can be read at the same time, so vector reordering with four channels as a group can provide 4 times the bandwidth of non-reordering;

asynchronous processing: the systolic array can run at a higher frequency than logic processing modules; clock frequencies of X-bus and the systolic array are set to 250 MHz and 400 MHz, respectively.

A processing element of the systolic array comprises a multiply-and-accumulate unit and a flush unit;

the multiply-and-accumulate unit completes a multiplication calculation and an accumulation calculation in an inner product of the vector in each clock cycle, the calculation process is implemented by a DSP48E2 in the FPGA, and the multiply-and-accumulate unit can use all available pipelines in a DSP48E2 primitive;

the flush unit is used to output the inner product of the vector from the systolic array;

after the multiplication result of the last elements of the two input vectors is accumulated to an accumulation register, the flush unit will be notified to take away an accumulation result in the next cycle, and according to a time interleaving feature of the systolic array, the M flush units in the same column form a shift register chain of length M to output all the accumulation results in this column.

Beneficial Effects:

(1) this invention proposes a new parallel strategy based on the im2col algorithm, which applies parallelisms comprising the input channel level, the output channel level, and the output feature map level, the strategy does not depend on the input dimension, thus significantly reducing the influence of the convolution kernel and the shape of the feature map;

(2) In this invention, several on-chip buffers are designed to utilize abundant memory resources, at the same time, a memory management algorithm is developed and integrated into the compiler to manage the storage of intermediate results and convolution weight tensors.

(3) In this invention, a fully-pipelined systolic array is designed as the computing engine of convolution operation; a flexible and scalable bus is developed to transmit the feature map data to the systolic array with different shapes while maintaining high throughput.

Finally, this invention provides a flexible and applicable compiler system for deploying CNN models to FPGA-based high-performance accelerators, the compiler system provides a comprehensive tool flow based on ONNXIR, which can easily deploy different CNN models to FPGA.

BRIEF DESCRIPTION OF THE DRAWINGS

In order to explain the technical solution of this invention clearly, the attached figures that need to be used in the embodiment are briefly introduced in the following. Obviously, for ordinary technicians in this field, other figures can be obtained according to these attached figures without paying creative labor.

DETAILED DESCRIPTION OF THE EMBODIMENTS

The embodiment is described in detail in the following and the examples are shown in the accompanying figures. When the following description is related to the figure, the same numbers in different figures represent the same or similar elements unless otherwise indicated. The embodiment described in the following embodiment does not represent all the embodiments consistent with this invention, it is only an example of a system and methodology consistent with some aspects of this invention as detailed in the claims.

1. Embodiment 1

This invention provides a flexible and applicable compiler system for deploying CNN models to FPGA-based high-performance accelerators, which is used for mapping CNN models to FPGA-based high-performance accelerators. In order to effectively decouple from various deep learning frameworks, the compiler uses the ONNX (Open Neural Network Exchange) standard, ONNX provides a unified IR for deep learning models, at the same time, the introduction of ONNX also simplifies the design of the compiler, allowing it to freely select optimization strategies based on the capabilities of the target accelerator. In order to achieve higher throughput, the complex implementation of convolution is transformed into a general matrix multiplication call with the help of the im2col technology, and then it is accelerated efficiently using a systolic array.

Figure 1:
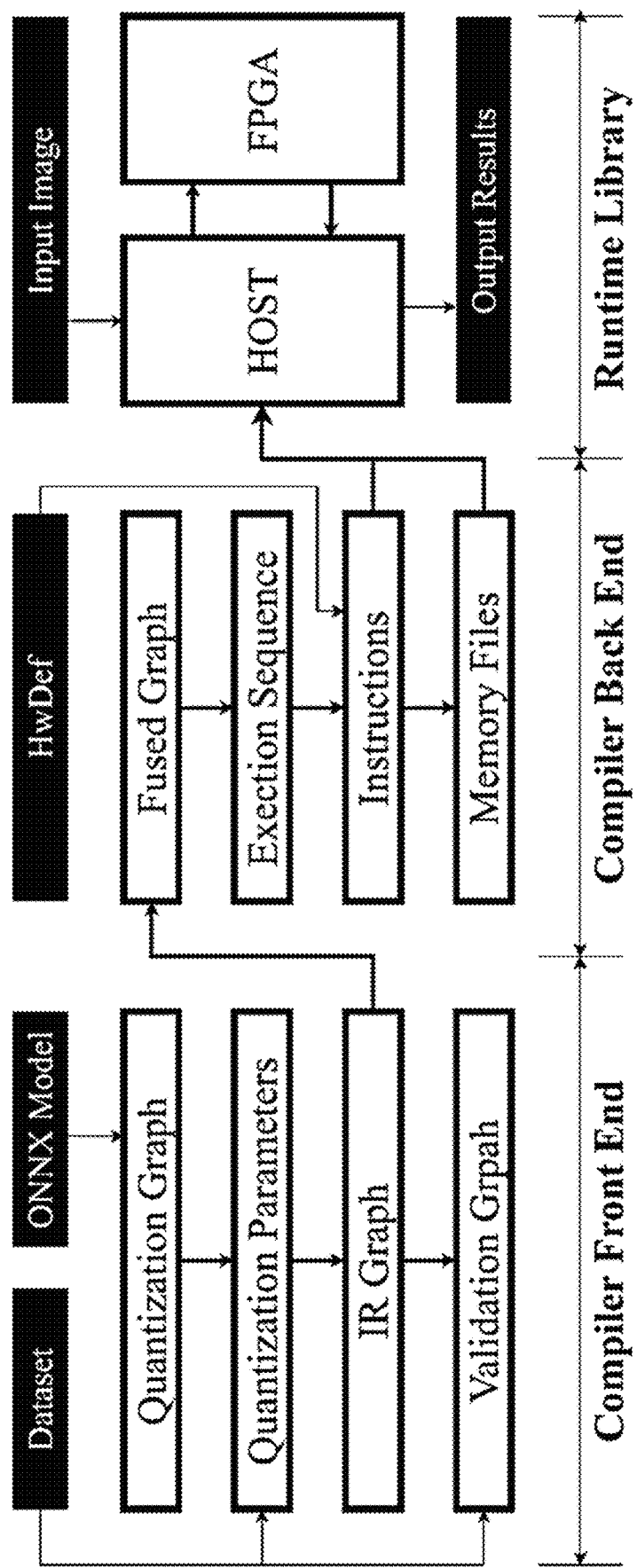
FIG. 1 is a connection figure of the compiler front end, the compiler front end, and the runtime library in the embodiment of this invention.

Specifically, as shown in FIG. 1, FIG. 1 is a connection figure of the compiler front end, the compiler front end, and the runtime library in the embodiment of this invention, the compiler system comprises the compiler front end and the compiler back end, as well as the FPGA-based runtime library and the accelerator;

the compiler front end is used for the quantization of the CNN model to be deployed based on the ONNX model and the training data set, and the IR Graph corresponding to the CNN model to be deployed is obtained;

In some embodiments, the compiler front end comprises the quantization parameter calculation unit and the quantization parameter verification unit;

the quantization parameter calculation unit is used to determine the ONNX calculation graph corresponding to the CNN model to be deployed based on the ONNX model and construct the quantization graph based on the ONNX calculation graph, and the calculation of quantization parameters based on the quantization graph and by running the inference task on the training data set to obtain the quantization parameters;

the quantization parameter verification unit is used to construct the verification graph and verify the quantization parameters based on the preset accuracy loss standard, if the verification result does not meet the preset accuracy loss standard, the quantization parameters are calculated again;

Specifically, the compiler front end takes the ONNX model and the training data set as input to generate IR. The process comprises four stages:

The first stage: A quantization graph is constructed based on the original ONNX graph to simplify the calculation of quantization parameters. The vertices in the figure represent the layers whose output tensors should be quantized and only the Cony, Gemm, Add, and Concat operators are retained because other operators (such as Relu and Pooling) do not affect the data distribution.

The second stage: A batch of inference tasks are operated on the training data set and the activation value range is collected to calculate the quantization parameters. Here, the quantization strategy can be easily redefined by realizing the provided interface. Weights are also quantified at this stage.

The third stage: Then the IR graph passed to the compiler back end is constructed. The vertices of the graph are self-defined ONNX operators, where the quantization parameters are represented as additional attributes.

The fourth stage: Finally, the validation graph is constructed and the post-quantification verification is performed to ensure that the loss of accuracy is acceptable. In order to construct the graph, the self-defined operator in IRGraph is automatically implemented by combining multiple built-in operators and its calculation behavior is the same as that performed on hardware. According to the verification results, different strategies can be tried to find the most accurate quantitative parameters by turning to the second stage.

This invention verifies several typical CNN models and lists the accuracy of Top-5 in Table 1. The accuracy losses of most models are within 2%, except that SqueezeNet1.0 shows more accuracy loss. The results are acceptable considering the simplified quantification strategy currently applied in this embodiment of the invention.

TABLE 1

Precision verification results of Top-5

| Model | fp32 | uint8 |
|---|---|---|
| LeNet5 | 100.00% | 100.00% |
| AlexNet | 82.70% | 82.01% |
| ZFNet | 84.29% | 83.08% |
| SqueezeNet 1.0 | 80.62% | 76,28% |
| SelecSLS-42b | 93.97% | 93.19% |
| VoVNet-27-slim | 90.08% | 88.87% |
| ResNet18 | 89.17% | 88.37% |
| ResNet34 | 91.50% | 90.62% |
| ResNet50 | 92.94% | 91.41% |
| Vgg11 | 88.73% | 88.33% |
| Vgg13 | 89.33% | 89.13% |
| Vgg16 | 90.46% | 90.13% |
| Vgg19 | 90.94% | 90.09% |

The compiler back end is used to determine instructions and configuration information corresponding to the CNN model to be deployed according to the IR Graph, and the instructions and configuration information are saved as the binary file;

In some embodiments, the compiler back end comprises an instruction generation unit and a static data determination unit;

the static data determination unit is used to determine static data for the accelerator according to the quantized model and deserialize to files with hex format;

the static data comprises pre-trained weight and bias tensors, the packet descriptors, and instruction sequences.

The on-chip buffers comprise RTM, CWM, BM, IM, and XPHM;

the RTM is used to store the three-dimensional activation tensors for convolution and pooling operations, and the one-dimensional vectors for fully-connected layers.

the CWM is used to store the weight tensors for convolution operations;

the BM is used to store the bias for both convolutional layers and fully-connected layers;

the IM is used to store the instructions corresponding to the CNN model to be deployed;

the XPHM is used to store packet descriptors for convolutional and pooling layers.

Specifically, the compiler back end is responsible for processing IR and generating instructions and configuration files for the target accelerator, which consists of multiple Passes on the IR Graph. Firstly, FusionPass is performed to exploit the coarse-grained features of ISA, where the Relu operator is absorbed by its previous vertex, and the Flatten operator between Cony and Gemm is mapped to the input pattern of its next Gemm vertex. Then, the virtual input is adopted to perform DimensionPass to determine the dimension of the intermediate tensor. Because the operator is executed one by one, the execution order is determined according to the topology by ExecutionPass. The operators in the sequence are converted into corresponding instructions in InstructionPass.

Thanks to the efficient memory management scheme and the deep pipeline hardware architecture, the operators can be directly converted without tiling. The hardware needs to store the static data (comprising quantized weights and the biases, instructions, and packet descriptors), the input tensor, and the output tensor in DRAM, which is implemented in DRAMPass. The allocation of each on-chip buffer, comprising CWM, RTM, BM, IM, and XPHM, is also defined as a separate Pass. The memory content of each buffer is saved as a hexadecimal file, and the register configuration information is saved as key-value pairs.

In addition, DebugPass is designed to output debugging information, such as readable instructions, visual memory allocation results, and memory usage reports. PassManager is used in the process of integrating and scheduling the above Passes.

The embodiment of this invention uses coarse-grained instructions to describe the CNN model and configure the computing engine. The ISA of the embodiment of this invention has four types of instructions, each of which consists of a 2-bit opcode and a maximum of 461 operands.

1) CONV denotes a Cony operator with 461-bit operands, comprising the address and length of the tensor involved (e.g., input tensor, output tensor, weight tensor), shape parameters (e.g., KH, KW), quantization parameters (e.g., $x_z$, $y_z$) and some other configurations (e.g., $N_x$, $N_w$).

2) MAXP and AVGP correspond to MaxPool and AveragePool operators, respectively. Since the pooling engine and the convolution engine share the same $M_x$ input module, MAXP and AVGP reuse the layout and decoding circuit of CONV. The GlobalAveragePool operator is automatically converted to an AVGP instruction by the compiler.

3) ADD represents the Add operator. It has 121 operands, comprising quantization parameters and the address and dimension of the related tensors. ADD can be executed simultaneously with other instructions to achieve instruction-level parallelism (ILP).

4) FC corresponds to the Gemm operator. In addition to the address, dimension, and quantization parameters, an additional bit is comprised to represent the input vector's storage mode (V-mode or T-mode).

The 461-bit operand contains a 1-bit sign to indicate the next Relu operator. Thanks to the efficient memory management algorithm and the deep pipeline hardware architecture of the computing engine, the original ONNX operator can be converted into corresponding instructions without tiling.

In some embodiments, the RTM comprises four independent storage blocks, each of which has a data bit width of 256 bits and can store 32 pixels with int8 precision;

the RTM has two storage mode, T-mode and V-mode, with the T-mode for storing three-dimensional tensors and the V-mode for one-dimensional vectors.

when the three-dimensional tensor needs to be stored in T-mode, the two-dimensional feature map is placed in each storage block in sequence according to a channel order; for the two-dimensional feature map, after the pixels of the two-dimensional feature map are expanded into one-dimensional vectors, and the one-dimensional vectors are arranged in the corresponding storage blocks in turn, if the number of tensor channels of the two-dimensional feature map is not a multiple of 4, the compiler will automatically fill the number of tensor channels to a multiple of 4;

when the one-dimensional vectors need to be stored in the V-mode, elements of the vector are divided into segments and stored in RTM in turn, each segment contains 64 pixels and occupies two storage blocks; if the vector length of the one-dimensional vector is not a multiple of 64, the compiler will automatically fill the pixels to a multiple of 64 to ensure that the calculation result is correct.

Specifically, the off-chip DRAM is usually used as the main memory in the existing technology. In contrast, on-chip memory resources are faster and more flexible. Considering that vendors tend to integrate large-capacity and high-bandwidth memory primitives (such as URAM in Xilinx devices) into FPGA chips in recent years, several buffers and corresponding allocation algorithms have been set to utilize rich on-chip memory resources.

Figures 2A, 2B:
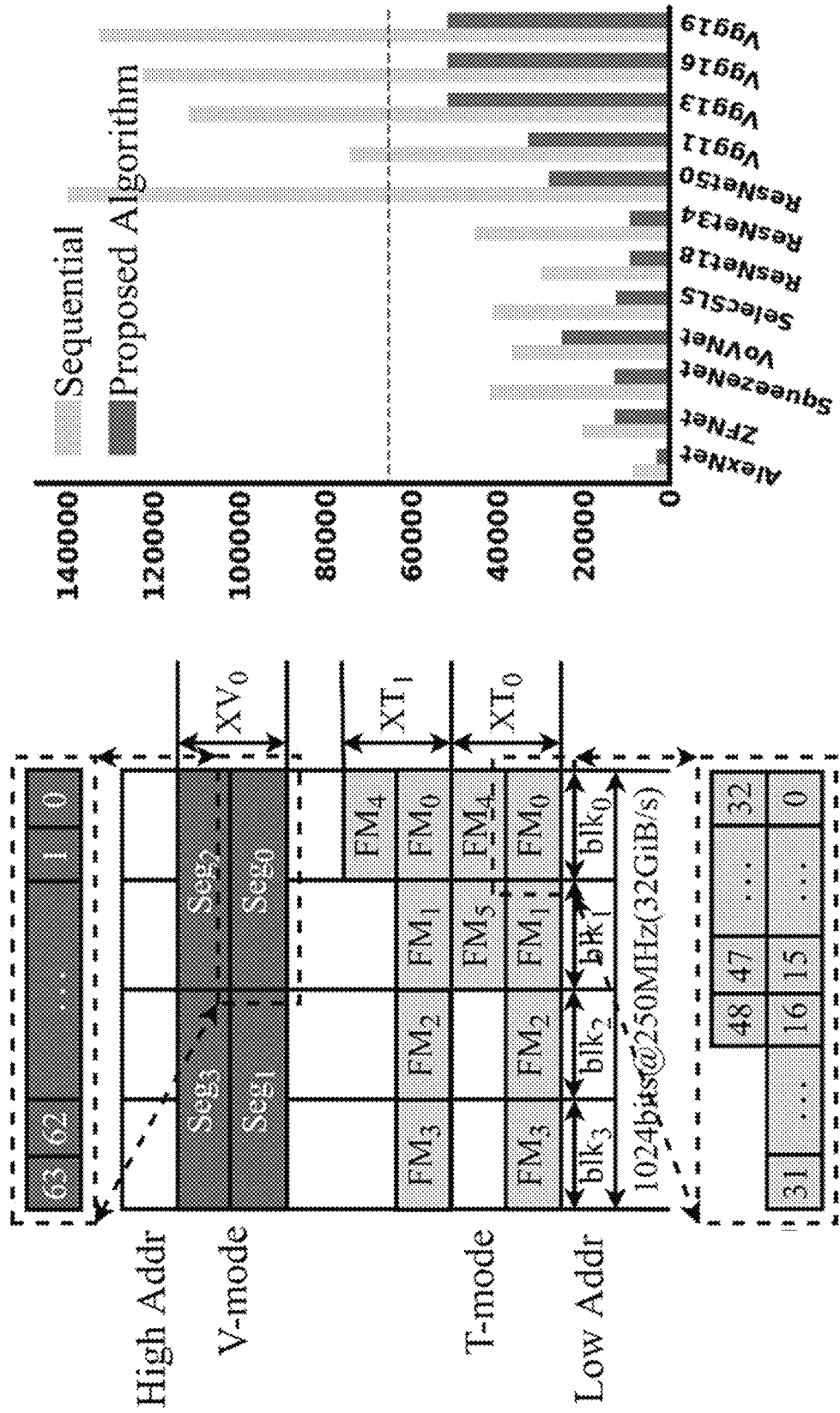
FIGS. 2A-2B show a memory layout figure of the RTM in the embodiment of this invention.

As shown in FIGS. 2A-2B, FIGS. 2A-2B show a memory layout figure of the RTM in the embodiment of this invention; the RTM is designed to store intermediate results. FIG. 2A is an RTM memory layout, $XT_0$ and $XT_1$ are T-mode, and $VT_0$ is V-mode. The size of the example $XT_0$ is (6,7,7). FIG. 2B compares the memory usage of the sequential allocation and the proposed algorithm on different CNN models. The dotted line represents the capacity of the RTM, specifically 65,536 items.

The RTM consists of four independent blocks. Each block has a bit width of 256 bits, so each address can store 32 pixels. The tensors of convolution and pooling operations and the vectors of fully connected operations are stored in tensor mode (T-mode) and vector mode (V-mode), respectively. In T-mode, the feature map is managed as a two-dimensional array, and each block corresponds to a column. If the number of channels is not a multiple of 4, an incomplete row exists. The pixels in the feature map are expanded into one-dimensional arrays and placed one by one. In addition, the Padding of convolution is also processed by logic rather than directly stored in RTM, which helps to store tensors more effectively. RTM can read/write four feature maps simultaneously in one clock cycle, which meets the requirements of X-bus. In V-mode, the elements of the vector are managed as separate segments, each segment contains 64 pixels and is spanned in two blocks. Storing all intermediate results without overlapping requires a lot of memory resources, and the compiler is prevented from supporting deeper models and memory-deficient devices. In fact, most results do not need to be stored due to the sequential execution mode.

In addition, the embodiment of this invention provides a memory allocation algorithm based on reference counting and assigns the tensor address of the instruction when compiling to minimize the capacity of RTM. By applying the sequential strategy and the proposed algorithm, the capacities of RTM required by 12 CNN models are compared. The results show that the embodiment of this invention saves 1.46 times (36736 vs.25088 in VoVNet) to 4.97 times (140192 vs.28224 in ResNet50) of memory usage. For ResNet50 and Vgg models, the sequential strategy cannot allocate memory for all involved tensors, and the proposed algorithm still operates well.

In some embodiments, the CWM comprises the static segment storage area and the dynamic segment storage area with adjacent settings;

the static segment storage area is used to store the weight tensors that are pre-loaded before running inference;

the dynamic segment storage area is used to cache weight tensors that are loaded from DRAM during the inference;

moreover, the dynamic segment storage area controls the access to the dynamic segment storage area through a double pointer mechanism;

the dynamic segment rd_ptr represents the address of the next expected data;

the dynamic segment wr_ptr represents the maximum address of the current valid data, the dynamic segment wr_ptr moves to the low address of the dynamic segment storage after configuring the static segment storage area or at the beginning of the convolution instruction, the dynamic segment wr_ptr will be updated when the convolution weight arrives;

if an entry of the dynamic segment storage area needs to be read, it should be satisfied that the dynamic segment wr_ptr is greater than the dynamic segment rd_ptr.

Figure 3:
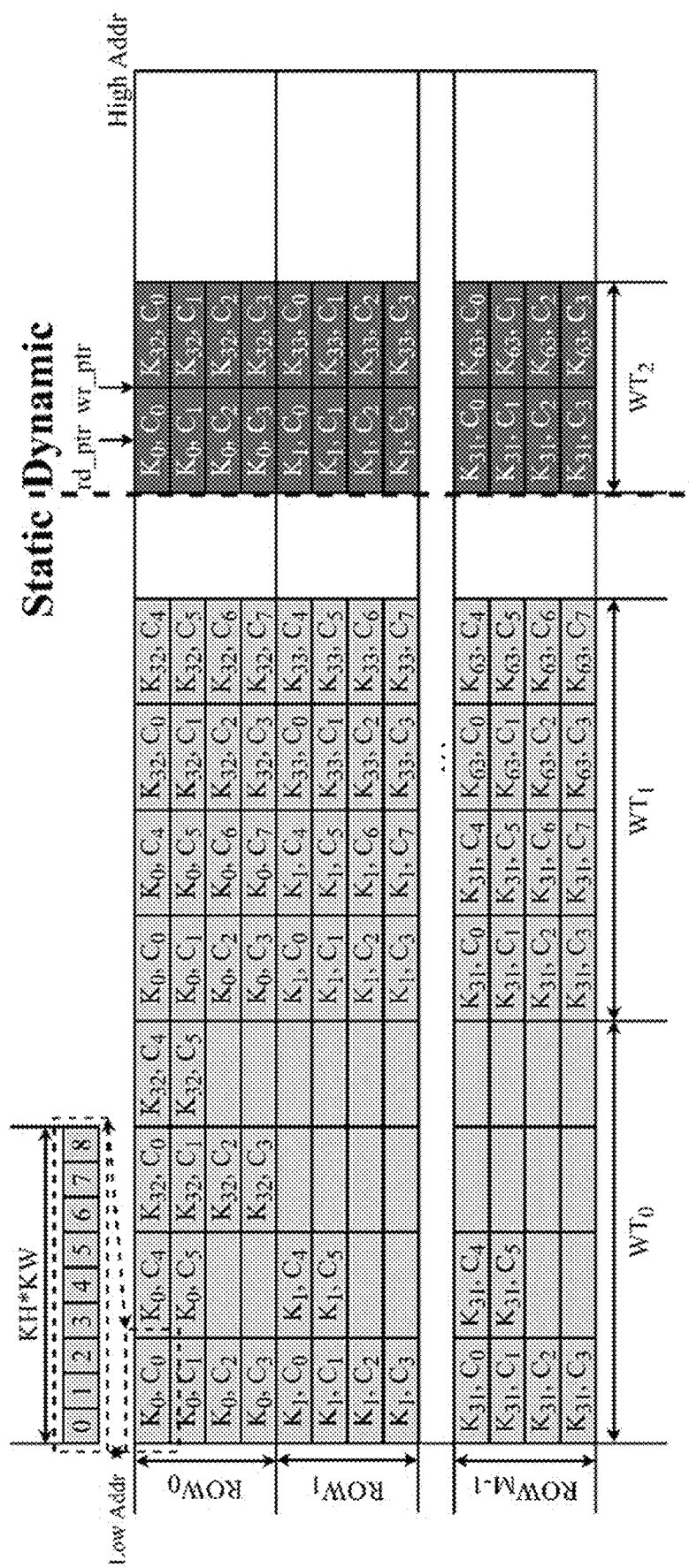
FIG. 3 is a memory layout figure of the CWM in the embodiment of this invention.

As shown in FIG. 3, FIG. 3 is a memory layout figure of the CWM in the embodiment of this invention, $WT_0$ and $WT_1$ are located in the static segment, and $WT_2$ is located in the dynamic segment. The size of the example $WT_0$ is (33,6,3,3). FIG. 3 illustrates the storage mode of tensors in CWM. INC and OC are aligned with multiples of 4 and M, respectively. The memory content is generated during compilation and loaded into DRAM before inference. CWM consists of two parts. The tensor in the static segment is preloaded from DRAM during the initialization phase, and its content remains unchanged during inference, the dynamic segment is designed to cache unpreloaded tensors, so its content is variable, the static segment starts from the low address of CWM, followed by the dynamic segment.

Since the dynamic weight is loaded from the bandwidth-limited DRAM, the embodiment of this invention provides a double pointer mechanism to eliminate the memory access overheads, where rd_ptr and wr_ptr represent the address of the next expected data and the maximum address of the currently valid data, respectively. wr_ptr will move to the low address of the dynamic segment after configuring the static segment or at the beginning of the convolution instruction, and will be updated when the weight data arrives. The read operation can be successful when wr_ptr is greater than rd_ptr.

In practical use, as many weights as possible should be saved in the static segment. The embodiment of this invention provides an allocation algorithm and integrates it into the compiler to manage weights. The algorithm uses two lists to record the static and dynamic weights. Initially, it is assumed that the weight tensors are dynamic and stored in a descending order according to their volume. Then the algorithm attempts to move the first tensor to the static segment and update the list if the movement is legal, which means that the sum of the total volume of the static weight and the maximum volume of the dynamic weight does not exceed the capacity of the CWM. Otherwise, the subsequent tensor will be attempted until the movement is successful, or the algorithm exits when all attempts fail. In fact, the weights of all evaluated CNN models can be stored in the static segment except for SelecSLS.

IM represents the instruction memory, which is used to store the compilation instructions of the target model and can be configured at operation time to switch between CNN models. Although the bias is represented as 32-bit data, the total volume is not large, so the bias can be stored in BM. In the embodiment of this invention, all X packet descriptors are stored in XPHM.

The contents of the above buffers are generated by the compiler and preloaded before the inference.

The FC weights cannot be stored on the chip due to their large size. Instead, these tensors are stored in DRAM and loaded through a DMA engine.

The runtime library is used to store instructions and configuration files to DRAM, and FPGA is configured according to the configuration information of the model;

Specifically, the host runs general tasks, and the FPGA works as a coprocessor and performs computationally intensive inference tasks. The embodiment of this invention provides a library to hide hardware details for user applications. The system will go through three stages. In the DRAM configuration stage, the host reads key-value pairs and memory content files into its main memory, and configures DRAM content through the PCIe interface. These operations are encapsulated in the function dram_cfg. Then the system enters the FPGA configuration stage and prepares to configure the static content of registers and on-chip buffers. The embodiment of this invention provides the function fpga_cfg for this stage. This function can also be used to easily switch CNN models when operating. After that, the system can operate the inference tasks. The function infer writes the input image to the DRAM and sends a start command to the accelerator. The infer function will be blocked until the done interrupt is pulled up, and the result will be read from the DRAM and returned. The interrupt will be cleared before the function exits so that new inference tasks can be performed. The embodiment of this invention also provides a finer-grained API for user applications.

In some embodiments, the scalable hardware module, X-bus is also developed to implement the im2col algorithm on-chip;

the X-bus comprises a packet generator and several filters;

the packet generator is used to read the three-dimensional tensor from the RTM and recombine the three-dimensional tensor into a virtual feature map matrix with the column vector of length Q, and organize pixel data in the virtual feature map matrix into data packets;

each data packet is composed of a packet descriptor and several payloads;

the packet descriptor contains four fields, comprising X_a_, len_per_chan, win_x, and win_y; where X_a_ and len_per_chan are the starting address and the length of the data packet in the virtual feature map, respectively, and win_x and win_y are positions of the sliding window corresponding to the data packet;

the payloads carry the pixel data and follow the packet descriptor;

the filters receive and cache data packets, and set Command Z, Command X, and Command E to describe the behavior of caching access, and use the cache read pointer rd_ptr to describe the current access state;

Command Z has no operands, it represents four zero elements, which can be processed directly without reading the cache;

Command X is used to indicate the reading of four pixels, the operands comprise shift and b_, shift represents the number of steps that need to be moved to locate the entry of rd_ptr where data in the cache is located, and b represents the address offset of the data in the entry;

Command E is used to end the access to the current packet and move rd_ptr to the next packet header.

Figure 4:
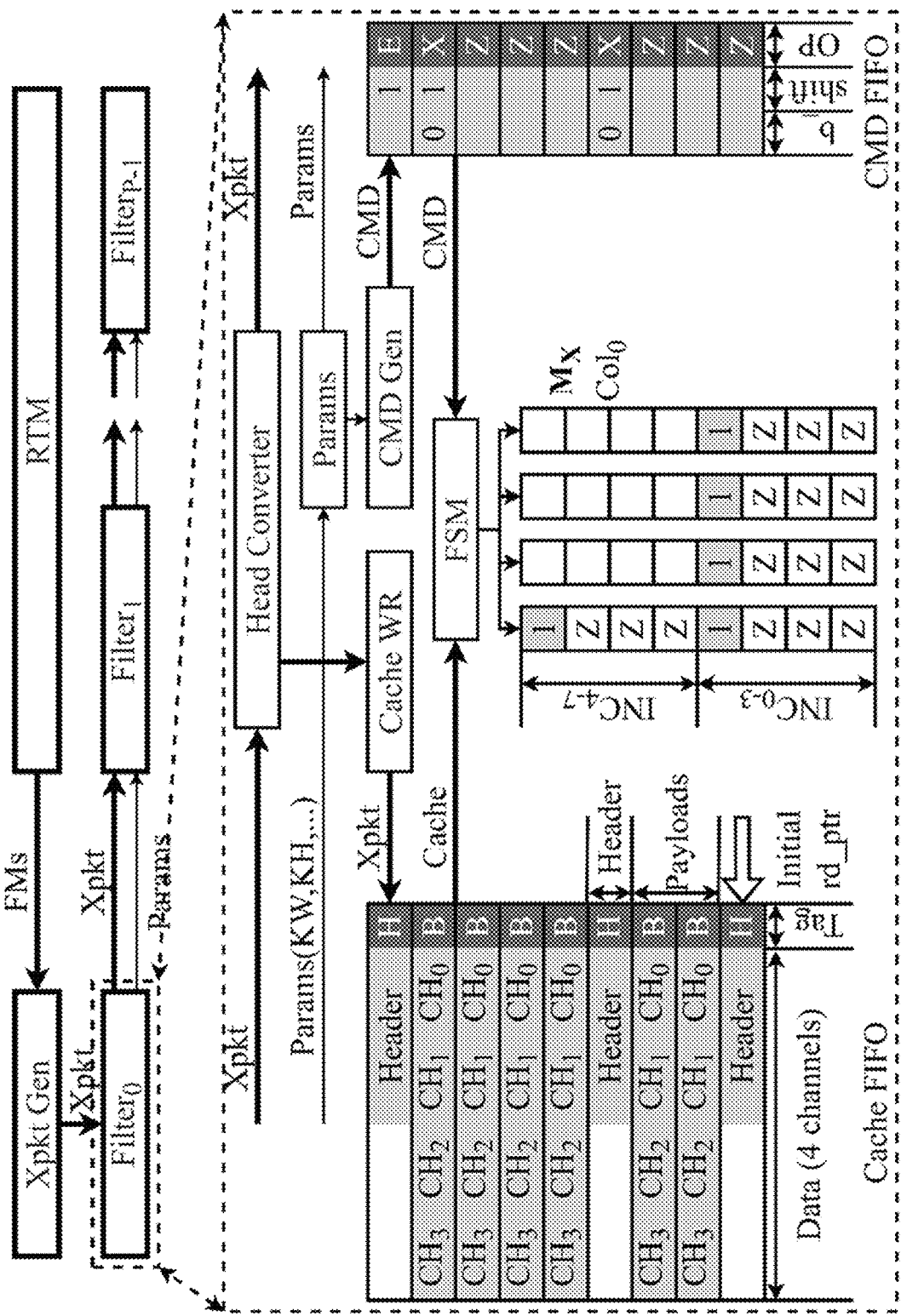
FIG. 4 is a detailed structure figure of the X-bus and Filter in this invention.

Specifically, X-bus is a flexible high-performance bus that provides $M_x$ for the convolution and pooling engines. As shown in FIG. 4, FIG. 4 is a detailed structure figure of the X-bus and Filter in this invention, and the pixels are organized as data packets Xpkts. Xpkt Gen reads the feature map from RTM and converts it into a packet.

There are P Filters in total, and each Filter corresponds to a column of the systolic array. Xpkts are transmitted in these filters. Filter not only filters its corresponding column vector but also delays the packet by one clock and passes the delayed packet to the next filter. The width of the physical bus is configurable, depending on the design variable Q.

Figure 5:
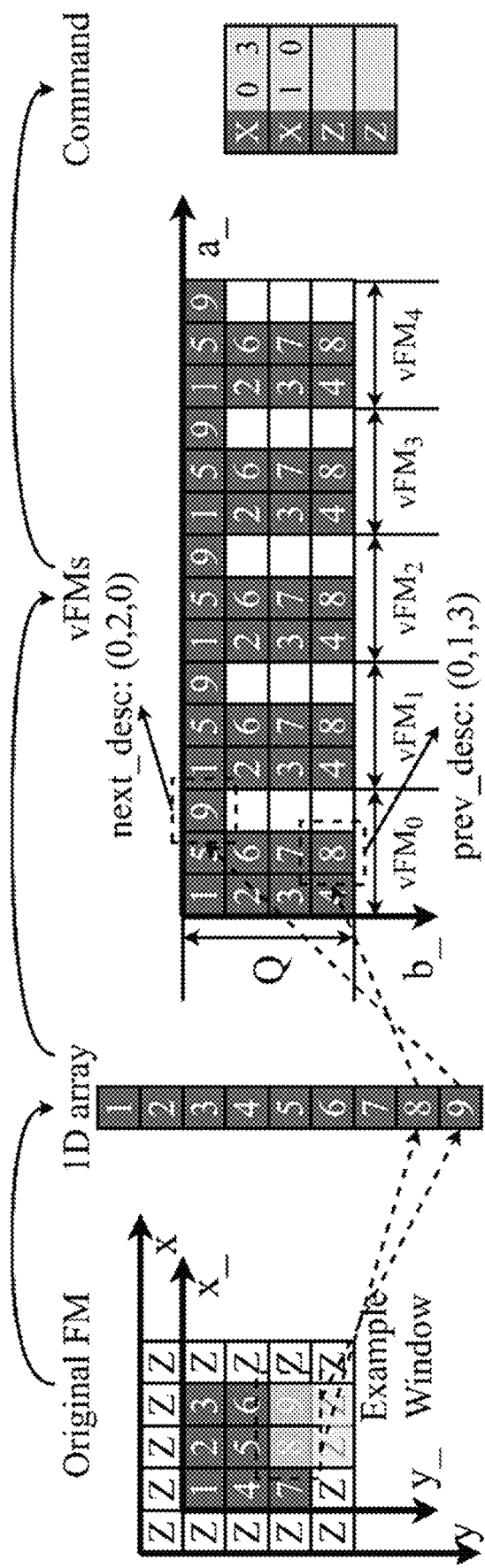
FIG. 5 is a schematic figure of the virtual feature map and the access command generation algorithm in the embodiment of this invention.

As shown in FIG. 5, FIG. 5 is a schematic figure of the vFM and the access command generation algorithm in the embodiment of this invention, and the design variable Q in FIG. 5 is set to 4. The feature map is reorganized into a matrix with a column vector of length Q (virtual feature map matrix). In the embodiment of this invention, the virtual feature map matrix vFM is placed in the coordinate system (a_, b_) to facilitate the description of the pixels. A batch can be formed by adjacent columns, which can be described by the descriptor {a_, len}, where a_ and len correspond to the x-coordinate of the first column and the number of columns in this batch, respectively.

Figure 6:
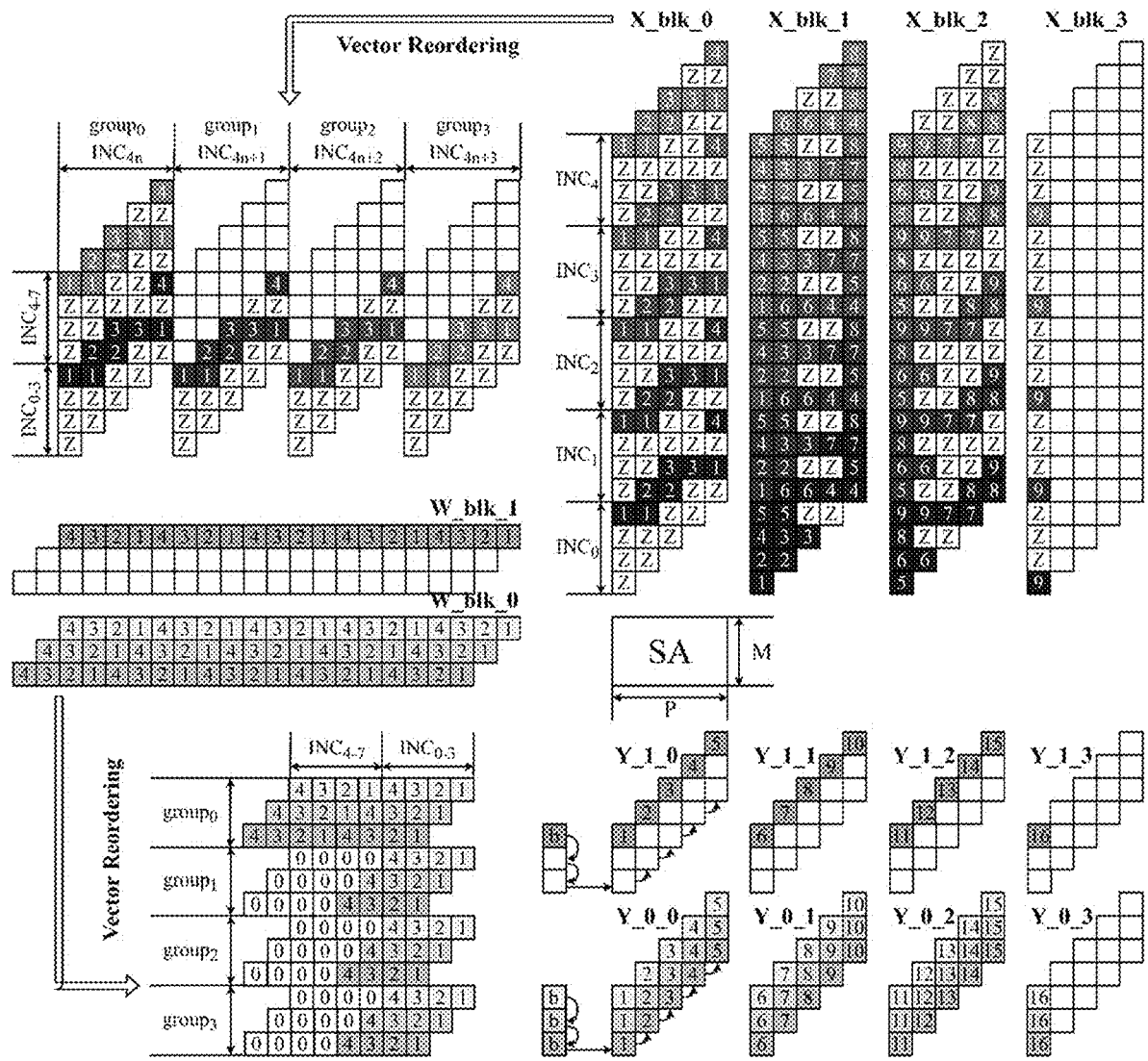
FIG. 6 is a schematic figure of the convolution acceleration strategy in the embodiment of this invention.

As shown in FIG. 6, FIG. 6 is a schematic figure of convolution acceleration strategy in the embodiment of this invention, each X_blk corresponds to a pixel range. For example, X_blk_0 requires Pixels 1-4 in each feature map, while X_blk_2 requires Pixels 5-9. The range can be mapped to a batch of vFMs, so pixels are managed in the form of packets, and each X_blk corresponds to a packet. A packet consists of a packet descriptor and several payloads.

The packet descriptor consists of a batch descriptor and two other fields win_x and win_y, which represent the location of the first moving window in the packet. The payload carries the pixel data and follows the header of the packet. As shown in FIG. 4, four channels are set in each payload entry, and corresponds to group; in FIG. 6. The packet descriptors and payloads are transmitted on the same physical bus to save the on-chip resources. The embodiment of this invention identifies the type of entry through a 2-bit tag, where H, B, and E represent the package descriptor, payload, and last entry, respectively, and N represents an invalid entry. It should be noted that the packet descriptors only depend on shape parameters and design variables, and only Nx unique packet descriptors are needed to complete a convolution instruction, so they are generated by the compiler and stored in XPHM in advance.

Figure 7:
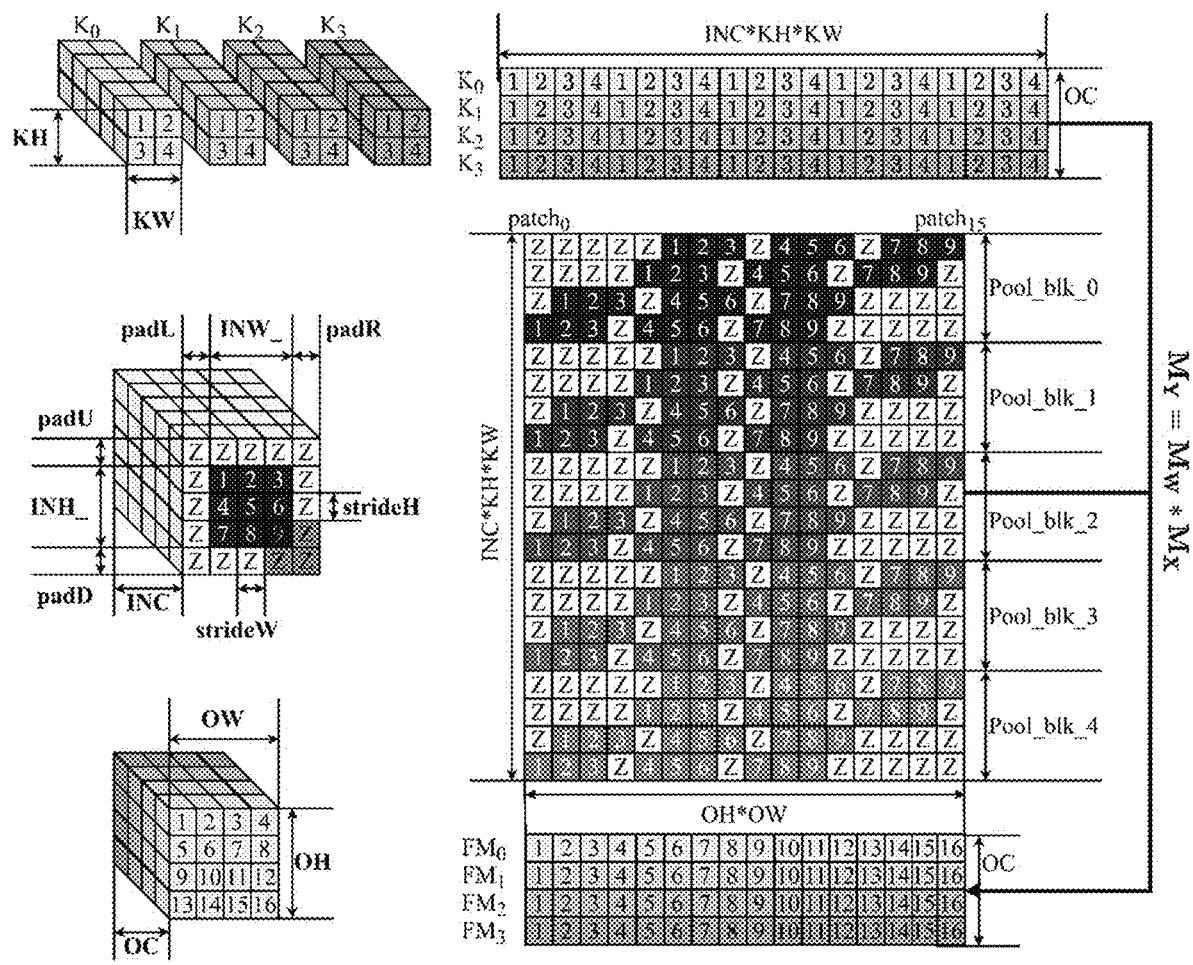
FIG. 7 is a definition of shape parameters and illustration of im2col figure in the embodiment of this invention.

In FIG. 7, HeadConverter converts the location of the moving window to the location of the next column and passes the converted packets to the next filter. CacheWR writes all entries to CacheFIFO since processing an entry may consume multiple cycles. The temporary memory cache FIFO is a dedicated module with the same write behavior as the ordinary FIFO. The difference is that the temporary memory cache FIFO can delete multiple entries before reading them. The shape parameter is also transmitted hop by hop to reduce the fan-out of configuration registers.

The difficulty lies in how to effectively read the column vectors from the cache and simultaneously process the padding and various shape parameters. In the embodiment of this invention, three types of commands Z, X, and E are designed to describe the behavior of the cache access.

Initially, rd_ptr points to the first entry. Command Z has no operands, representing four zero elements, so it can be processed directly without reading the cache. Command X indicates that four pixels should be read from the cache, and the operands shift and b_ represent the number of steps that the rd_ptr should move to locate the target entry and the b_ coordinate of the entry, respectively. It should be noted that rd_ptr should point to the header of the next packet after the previous packet is processed, which is implemented by Command E, where the operand shift has the same meaning as Command X.

As shown in FIG. 5, the control logic is defined in the FSM. The embodiment of this invention provides an algorithm to generat Command Es when operating. The algorithm supports arbitrary shape parameters. In this algorithm, a pixel has four representations in the coordinate system (x, y) and (x_, y_), one-dimensional array and vFM respectively. The embodiment of this invention uses two vFM descriptors, prev_desc, and next_desc to record pixel locations and calculate access commands. The algorithm is designed as a five-stage pipeline and defined in CMDGen to generate a command per clock cycle.

In some embodiments, the fully-pipelined systolic array is connected to the FSM of the X-bus through FIFO to realize the back pressure mechanism;

each filter provides the stall_req signal to the packet generator, when any stall_req signal is raised, the packet generator will stop the current transmission by placing invalid entries on the X-bus until no stop request asserted.

Specifically, since the executions of Command X or Command E may require multiple cycles, FSM provides an unstable data flow. FIFO (XFIFO) is used to connect FSM and systolic array in this invention. When XFIFO is full, the number of entries in CacheFIFO will continue to increase, and X-bus should stop the transmission. Stopping the entire bus is feasible but it will lead to inefficiency, because the filters need to communicate with each other, and performance drops sharply as P increases.

The embodiment of this invention applies a flexible and extensible method to solve this problem. Each filter provides a stall_req signal to the packet generation module. When any stall_req signal is raised, the generation module will stop the current transmission by placing invalid entries on the bus, and then the transmission is resumed without stopping the request. The experimental results show that the efficiency of the systolic array can reach 99.81% for convolution instructions, which means that only 0.19% of the execution time of the systolic array is idle.

The convolution engine in the accelerator is a fully-pipelined systolic array corresponding to the instruction set based on the im2col parallel strategy.

Specifically, in ONNXIR, the computational layer of the CNN model is represented as various ONNX operators connected in the form of directed acyclic graphs (DAG). Although there are more than one hundred built-in operators, most CNN models only contain common operators, such as Conv, MaxPool, AveragePool, Add, Gemm, and Concat, which significantly simplifies the workload of the tool flow and hardware design in this invention.

Im2col is the basic algorithm of many deep learning frameworks (such as PyTorch and Caffe). As shown in FIG. 7, FIG. 7 is a definition of shape parameters and im2col figure in the embodiment of this invention. The basic idea of im2col is to expand all the moving windows of the input image into vectors, and then connect them column by column to construct a matrix, denoted as $M_x$. Another matrix $M_w$ is constructed by expanding all convolution kernels into vectors and connecting them row by row. The matrix $M_y$ is the product of $M_w$ and $M_x$. The output image can be reconstructed by recovering the feature map from the row vector of $M_y$.

The complex convolution operations are converted into regular matrix multiplications in this way, which are not affected by various shape parameters (such as the shape of the convolution kernel, the step size of the movement, and the shape of the feature map). Pooling and convolution have the same sliding window mechanism, so pooling operations can also benefit from im2col. By dividing $M_x$ into INC blocks along the vertical direction and performing a maximum operation or an average operation on each column vector of each sub-block, the matrix $M_y$ of OC (OC=INC) rows can be obtained. Each row vector of $M_y$ corresponds to an output feature map.

Most CNN accelerators have applied model quantization to achieve better performance. However, the quantization-related operators in ONNXIR are not flexible enough (for example, there are no built-in operators to support quantized Add and Pooling) to be applied to the design of the embodiment of this invention. In this invention, the full integer arithmetic quantization scheme is applied to the hardware architecture to quantify the weights and activations as unsigned 8-bit integers. The basic idea is to use the fixed-point data q to represent the floating point data r in the form of r=S(q−Z), where S and Z are the scaling coefficient and the zero point, respectively.

Conv

For Conv and Gemm operators, the following inner product of the vector is considered:

$$y_r = \sum_{i=0}^{N-1}\left(w_r^{(i)} x_r^{(i)}\right) + b_r;$$

The following can be obtained by applying quantification:

$$y_S(y_q - y_Z) = \sum_{i=0}^{N-1}\left(w_S\left(w_q^{(i)} - w_Z\right) x_S\left(x_q^{(i)} - x_Z\right)\right) + b_S(b_q - b_Z);$$

In the formula, $y_s$, $y_z$, $w_s$, $w_z$, $x_s$, $x_z$, $b_s$ and $b_z$ are constants. A signed 32-bit integer is usually used to represent the bias, as well as $b_s = w_s x_s$, $b_z = 0$, so it is possible to obtain the following:

$$y_q = M\left(\sum_{i=0}^{N-1}\left(w_q^{(i)} - w_Z\right)\left(x_q^{(i)} - x_Z\right) + b_q\right) + y_Z;$$

In the formula, $$M = \frac{w_s x_s}{y_s}$$

is the unique floating point number. M can be expressed as $M = 2^{-n} m$, where m is the integer part and $2^{-n}$ is the scaling factor. Therefore, the following can be obtained:

$$y_q = 2^{-n} m\left(\sum_{i=0}^{N-1}\left(w_q^{(i)} - w_Z\right)\left(x_q^{(i)} - x_Z\right) + b_q\right) + y_Z \quad \text{\#(1)}$$

Equation (1) can be regarded as a multiply-accumulative operation comprising pre-processing and post-processing.

Therefore, the quantized convolution operation can be efficiently implemented using the systolic array and an additional pipeline.

Pool

The calculation of the MaxPool operator in the quantization model is to find the maximum value of $x_q$, which can be written as:

$$y_q = \max(x_q^{(0)}, x_q^{(1)}, \ldots, x_q^{(N-1)}) \qquad \#(2)$$

The AveragePool operator is implemented as an accumulation operation with multiplication.

$$y_q = \frac{1}{N}\sum_{i=0}^{N-1} x_q^{(i)} \rightarrow y_q = 2^{-n}m\sum_{i=0}^{N-1} x_q^{(i)} \qquad \#(3)$$

In the formula, the floating point number 1/N is expressed as the 8-bit fixed point number.

Add

The Add operator adds two tensors with the same shape to generate a new tensor in the form of $C_r = A_r + B_r$. The quantization formula is as follows:

$$C_s(C_q - C_z) = A_s(A_q - A_z) + B_s(B_q - B_z);$$

the above formula can be rewritten as follows:

$$C_q = M_1(A_q - A_z) + M_2(B_q - B_z) + C_z;$$

in the formula, and $$M_1 = \frac{A_S}{C_S}$$

and $$M_2 = \frac{B_S}{C_S}$$

are floating-point numbers. 8-bit quantization is applied again to obtain the following:

$$C_q = 2^{-n_1}m_1(A_q - A_z) + 2^{-n_2}m_2(B_q - B_z) + C_z \qquad \#(4)$$

The equation still preserves the addition of elements and has some additional pre-processing and post-processing stages. According to Equations (1)-(4), the inference tasks only involve integer operations and can form a complete pipeline, so a high-performance accelerator can be designed by the embodiment of this invention.

In some embodiments, the convolution engine also comprises a synchronizer;

the synchronizer is used to deal with the synchronization relationship of the fully-pipelined systolic array;

the feature map row vector and the convolution weight column vector of the systolic array are from XFIFO and WFIFO, respectively, the row vector of XFIFO is written by FSM;

after the decoding of the instruction is completed, the engine starts to read the weight column vector immediately by the processor from the CWM and writing it to WFIFO, if the required weight entry has not been loaded into the CWM, the process will be blocked, the process will continue to execute until the required weight entry is loaded;

in each clock cycle, if the row vector and the column vector in XFIFO and WFIFO already exist, the synchronizer will read the row vector and the column vector simultaneously and provide them to the systolic array, otherwise the synchronizer will provide the 0 vector for the systolic array;

in the backpressure mechanism, outputs from the systolic array are buffered in the YFIFO, and the feedback signal will be sent to the synchronizer when the YFIFO is going to be full, which causes the synchronizer to stop reading input vectors from XFIFO and WFIFO and send 0 vectors to the systolic array.

Figure 8:
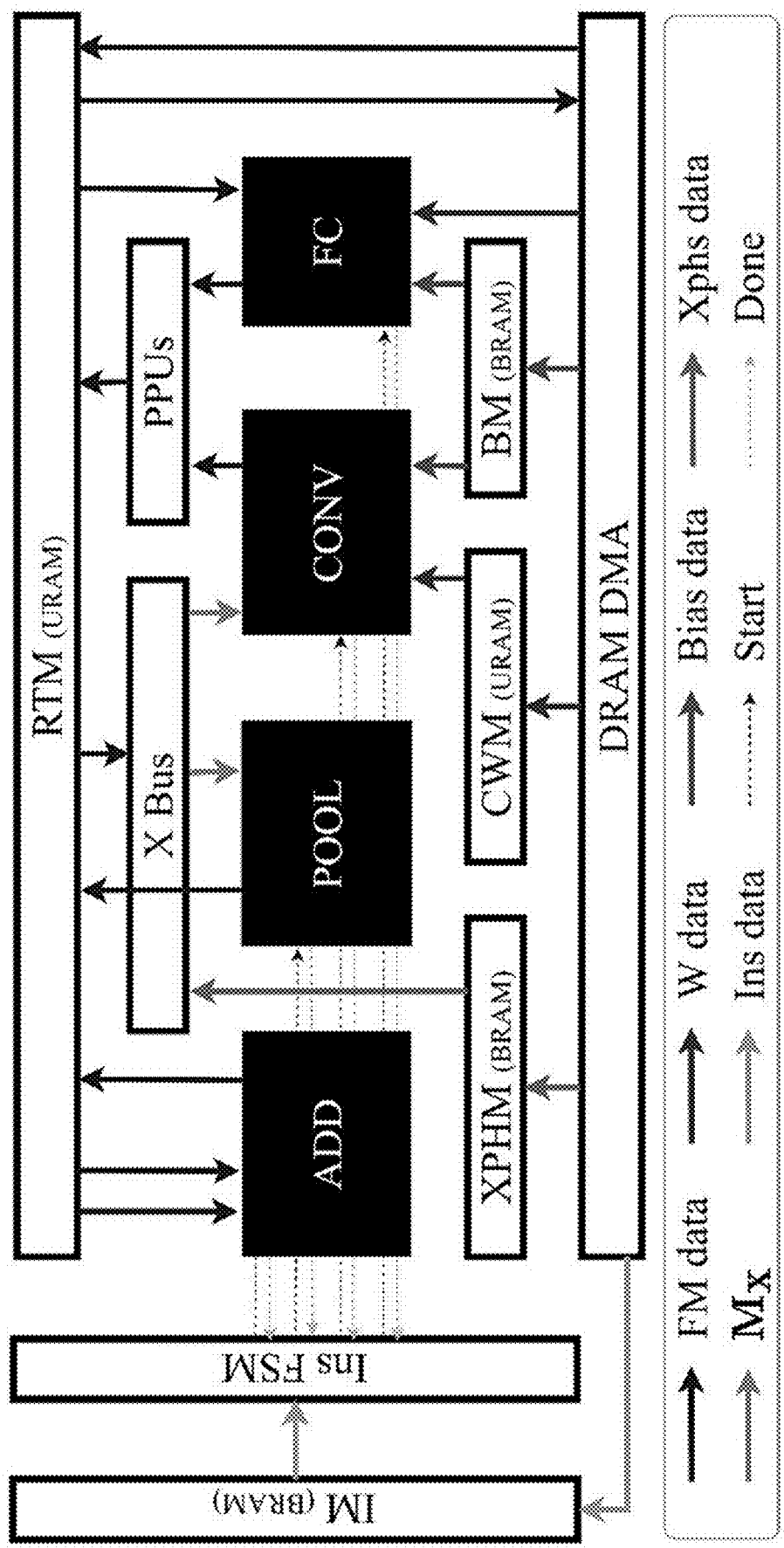
FIG. 8 is a hardware design and on-chip data flow in the embodiment of this invention.

Specifically, as shown in FIG. 8, FIG. 8 is a hardware design and on-chip data flow in the embodiment of this invention. Four computing engines are set in the embodiment of this invention, each computing engine corresponds to one instruction. The instructions are stored in IM (instruction memory). InsFSM reads an instruction and dispatches it to the corresponding computing engine by raising the start signal. The calculation engine processes the instruction and raises the done signal to inform the state machine that the next instruction can be processed. X-Bus implements the im2col algorithm and is shared by the convolution and pooling engines. Convolution and Fc engines have shared PPUs to save resources. Meanwhile, several on-chip buffers are also designed to quickly access data in the embodiment of this invention. FPGA only exchanges data with DRAM, and the custom DRAMDMA module is responsible for processing DRAM read/write requests issued by the buffer. Most modules work at 250 MHz, except for the systolic array in the convolution engine, which is running at 400 MHz for high throughput.

The synchronizer is responsible for handling the strict synchronization relationship in the systolic array. The delay between the input column/row and the output column is implemented by a shift register implemented by using LUT. The process starts with the decoding of the instruction, the row vector of Mw is prepared and written into W FIFOs. If the weight has not been loaded into the CWM, the process will be blocked to wait for the required weight, which naturally hides the delay in loading the weight from the DRAM. In each clock cycle, if the data in these FIFOs is ready, the synchronizer will take the next entry from these FIFOs, otherwise, the synchronizer will send zeros to the systolic array to ensure the correctness of the results. The synchronizer also reads the prog_full signal from the YFIFO and sends zero to the systolic array if the feedback is valid. Since the depths of these FIFOs are less than 64, the resource consumption can be significantly reduced. This module also handles clock domain crossing (CDC) issues.

In some embodiments, the system uses the high-speed fully-pipelined systolic array of M rows and P columns to accelerate matrix multiplications and reduces the number of duty cycles through workload scheduling, vector reordering, and asynchronous processing;

workload scheduling: the matrix multiplication $M_x \times M_w$ obtained by the im2col transformation of convolution is divided into small workloads; in the process of the workload scheduling, first, fixing the $M_x$ submatrix, traversing all $M_w$ submatrices, and then processing the next $M_x$ submatrix until all processing is completed;

vector reordering: storage format of tensors in RTM ensures that the pixels at the same position in four consecutive channels can be read at the same time, so vector reordering with four channels as the group can provide 4 times the bandwidth of non-reordering;

asynchronous processing: the systolic array can run at the higher frequency than logic processing modules; clock frequencies of X-bus and the systolic array are set to 250 MHz and 400 MHz, respectively.

Specifically, two-dimensional systolic arrays are widely used to manage the processing unit PE of the computing engine in the self-defined CNN accelerator. Each PE is connected to its adjacent PE in both horizontal and vertical directions. The connection has two advantages. First, the data can be transmitted hop-by-hop between PEs for reuse; secondly, the regular interconnection and network structure allow the computing engine to run at a high clock frequency. However, there are many choices to map the convolution operation to the systolic array, and different choices usually lead to different performance results. Therefore, it is usually necessary to design space exploration (DSE) to automatically search for the best strategy. Since im2col transforms convolution into simple matrix multiplications, it is much easier to design an effective mapping.

Figure 9A:
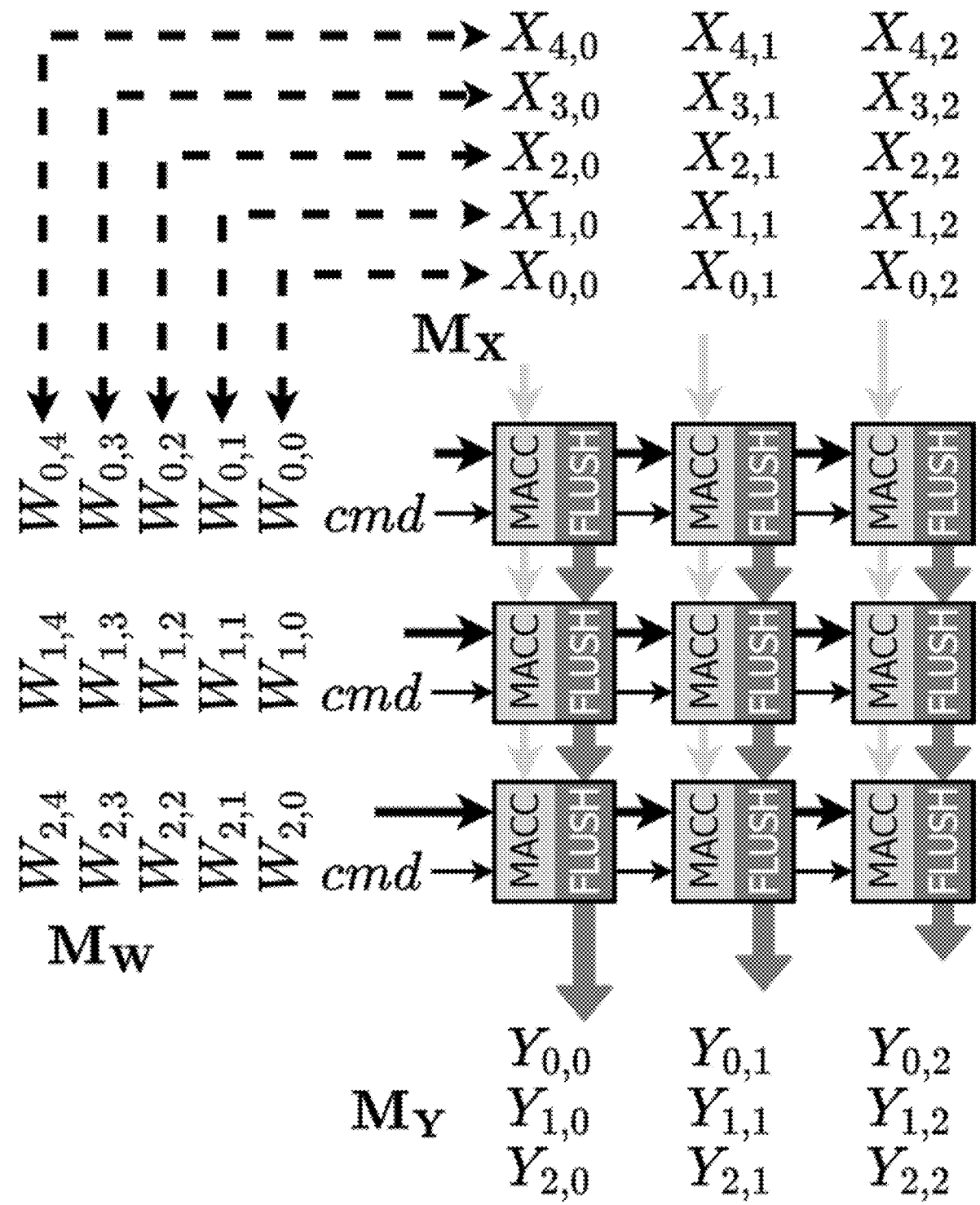
FIGS. 9A-9C show a schematic figure of the two-dimensional systolic array in the embodiment of this invention.
Figure 9B:
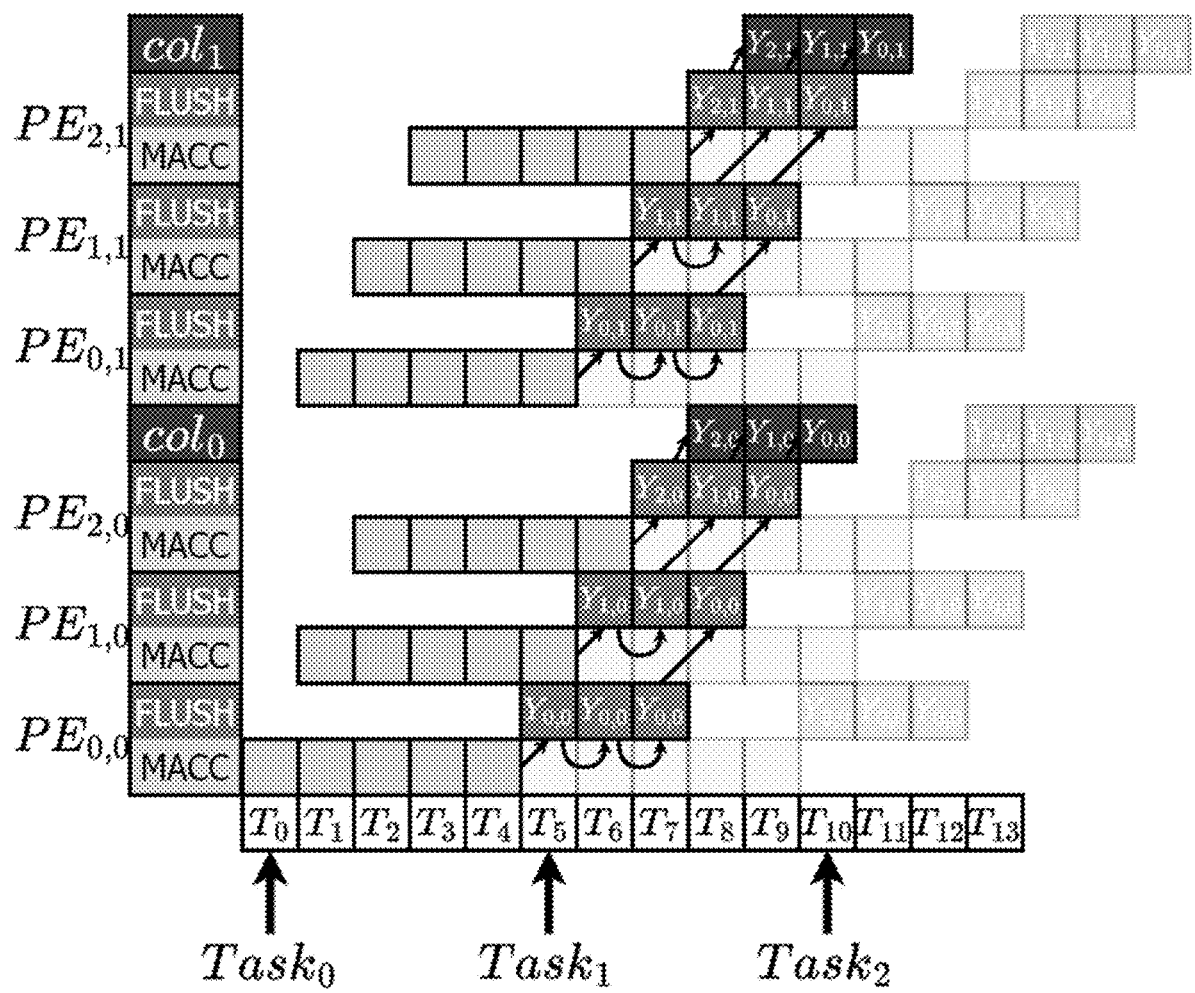
Figure 9C:
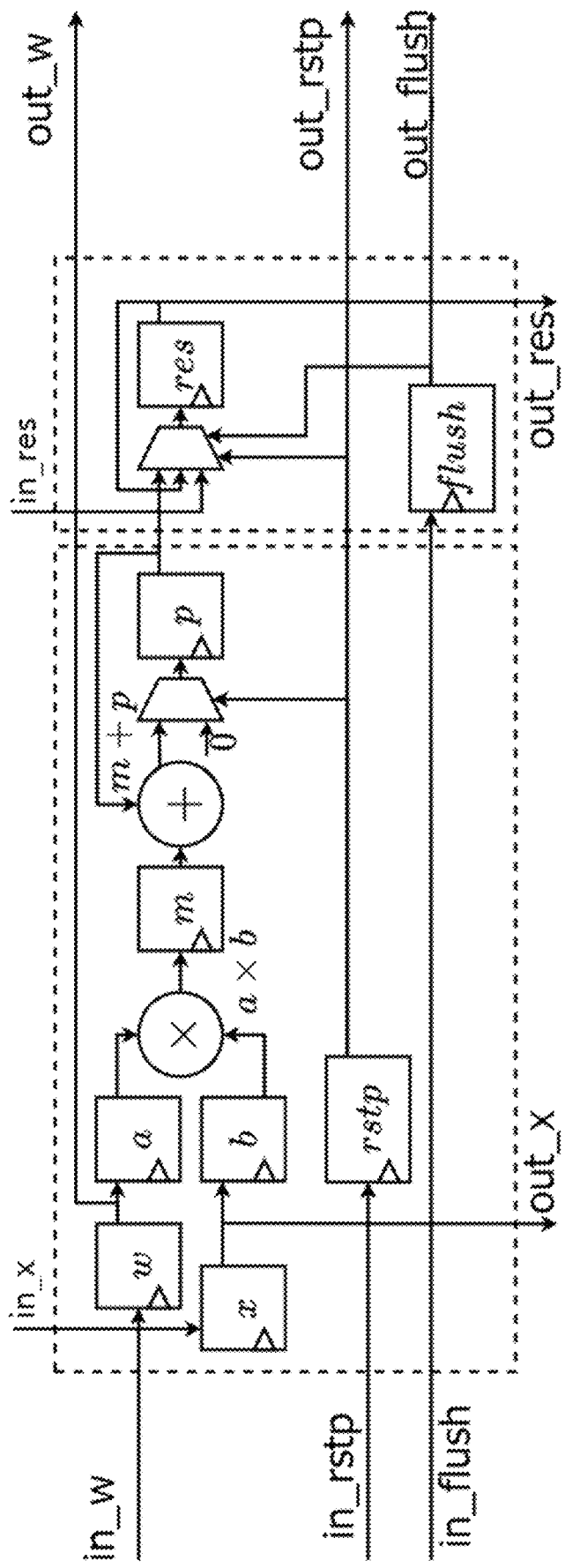

As shown in FIGS. 9A-9C, FIGS. 9A-9C show a schematic figure of the two-dimensional systolic array in the embodiment of this invention. FIG. 9A is a schematic figure for calculating $W_{(M, N)} X_{(N, P)} = Y_{(M, P)}$, $N \in \{1,2,3 \ldots \}$ by using the systolic array of M rows and P columns. FIG. 9B is a time-space figure of the first two columns. FIG. 9C is a detailed PE structure. In each clock cycle, a row of X and a column of W are input into the systolic array at the same time. Each PE performs a multiply-accumulative MACC on its input vector, and sends the result to the adjacent PE after the MACC is completed. Large-scale matrix multiplication can also be achieved by applying block technology and calling the systolic array multiple times. In addition, the MACC unit can be fully pipelined, which means that the systolic array can maintain peak throughput under ideal conditions.

The convolution operation is converted into matrix multiplication in this invention, and the systolic array with M rows and P columns is used as the calculation engine. If the number of columns of $M_x$ exceeds P, or the number of rows of $M_w$ exceeds M, the block technique needs to be applied. $N_w$=[OC/M] and $N_x$=[OH*OW/P] are defined as the number of blocks of $M_w$ and $M_x$, respectively. The $N_w*N_x$ matrix multiplication is designed as a two-stage for loop in the embodiment of this invention.

Firstly, an $M_x$ submatrix is fixed, all $M_w$ submatrices are traversed, and then the next $M_x$ submatrix is executed until all processing is completed. In this way, M output feature maps are calculated in parallel, and P pixels in each feature map are also calculated in parallel, so M and P correspond to the parallelism of the output channel and the output feature map level, respectively.

The systolic array of the embodiment of this invention is fully pipelined and runs at a higher clock frequency (sa_clk), while the matrix transmission module is located in the main_clk clock domain. Since the systolic array requires P $M_x$ pixels in each sa_clk cycle, if the sending module can only provide P pixels in each main_clk cycle, the overall throughput will be greatly reduced. Therefore, the embodiment of this invention rearranges X_blk into four groups, so that up to 4P pixels can be provided in a main_clk cycle. The systolic array obtains P pixels from one group in a sa_clk cycle and moves to the next group in the next cycle.

The row vectors of $M_w$ are also reordered similarly. INC is assumed to be a multiple of 4, which is true for most convolutional layers in modern CNN models. When assumptions are not satisfied, in order to ensure the correctness of the results, the embodiment of this invention applies zero padding to the weights because they can be processed in advance. From the perspective of main_clk, the parallelism at the input channel level is also effectively utilized.

The parallel strategy of the pooling operation depends on the above vector reordering mechanism. The pooling engine shares the same $M_x$ sending module with the systolic array, so it consists of 4P PEs, and each PE corresponds to a column vector of $M_x$. Therefore, four output channels are calculated in parallel, and P pixels in each channel are also calculated at the same time. In addition, resource utilization can be easily controlled by adjusting the design variables M and P, which indicates that the parallel strategy of the embodiment of this invention is flexible enough to target different devices and design goals.

In some embodiments, the processing element of the systolic array (PE) comprises the multiply-and-accumulate unit (MACC) and the flush unit (FLUSH);

the multiply-and-accumulate unit completes the multiplication calculation and the accumulation calculation in the inner product of the vector in each clock cycle, the calculation process is implemented by the DSP48E2 in the FPGA, and the multiply-and-accumulate unit can use all available pipelines in the DSP48E2 primitive;

the flush unit is used to output the inner product of the vector from the systolic array;

after the multiplication result of the last elements of the two input vectors is accumulated to the accumulation register, the flush unit will be notified to take away the accumulation result in the next cycle, and according to the time interleaving feature of the systolic array, the M flush units in the same column form the shift register chain of length M to output all the accumulation results in this column.

The MACC unit of PE calculates the dot product of the input vector, while the FLUSH unit is responsible for sending the results out. The results in the same column are transmitted to the corresponding YFIFO in the opposite order. Two stages exist in the FLUSH unit. The reset phase of the single clock cycle is entered after the last accumulation. At this stage, rstp is raised, the result in p is sent to res, and the value of q is reset. For a certain column, the shift phase of the M clock cycle comes after the reset phase of the last PE. The signal flush keeps raising i cycles (i∈[0, M−1] is the row index of PE). At this stage, res sends its value to the next PE and saves the value from the previous PE. At the same time, rstp and flush propagate horizontally in a hop-by-hop manner, so the PE column will complete the output task in turn. As long as N>=M(N=INC*KH*KW is the vector size), the MACC unit can be completely pipelined. This assumption is true for most convolution instructions. If the assumption fails, the compiler will automatically add zero padding.

Figure 10:
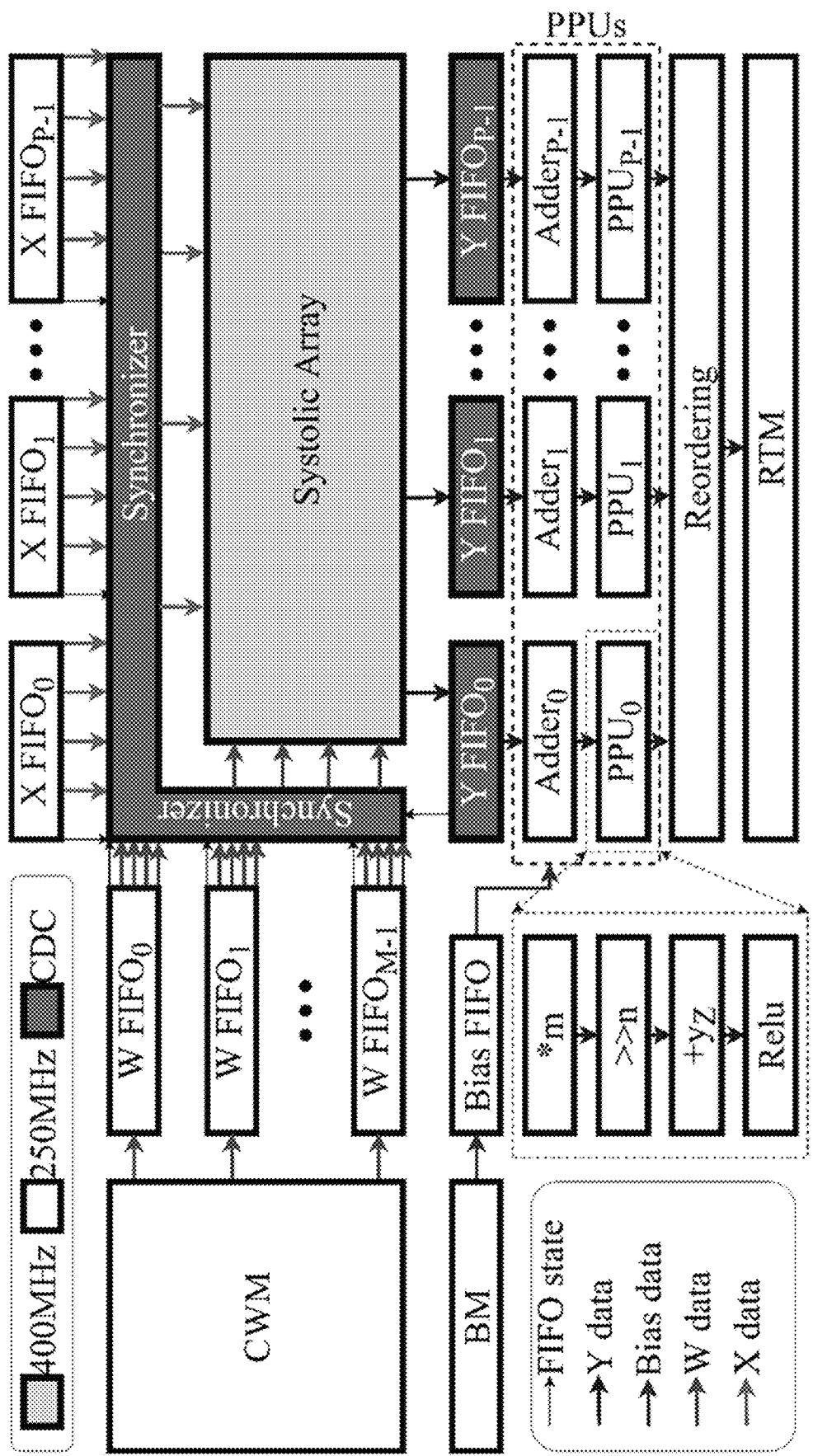
FIG. 10 is a structure and data flow of the convolution engine in the embodiment of this invention.
Figure 11A:
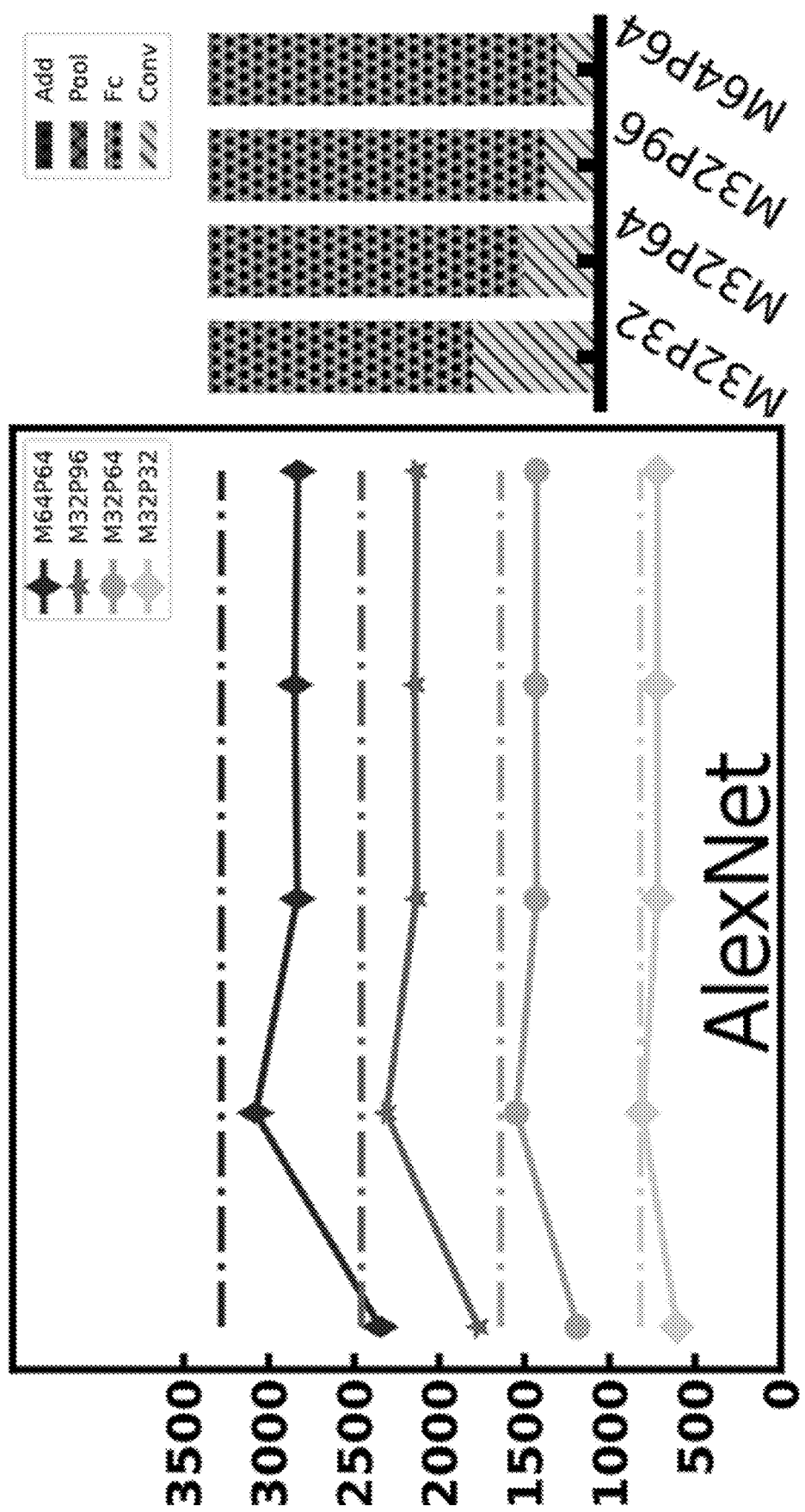
FIGS. 11A-11L show the throughput of M32P32, M32P64, M32P96, and M64P64 convolutional layers in this invention.
Figure 11B:
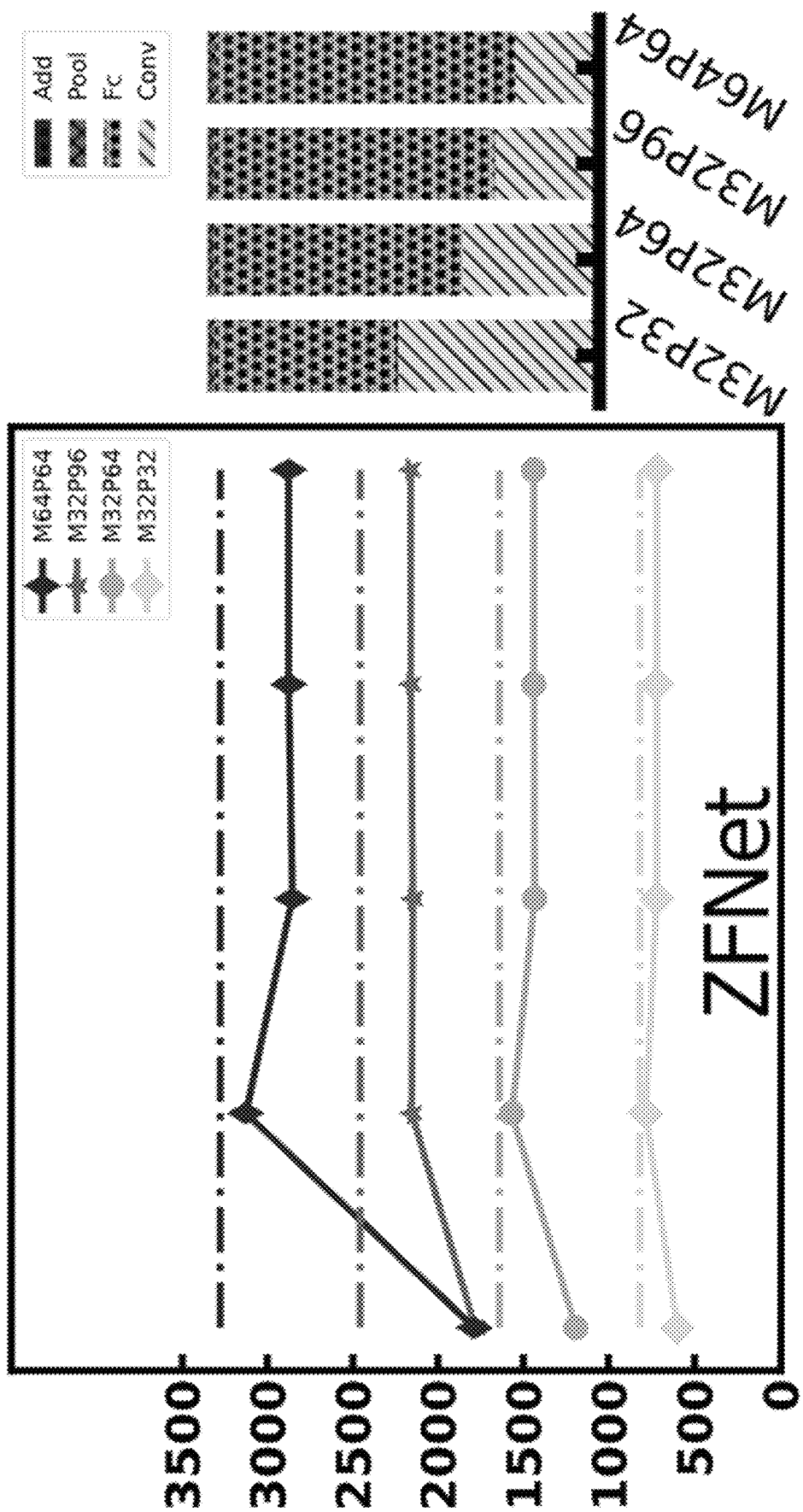
Figure 11C:
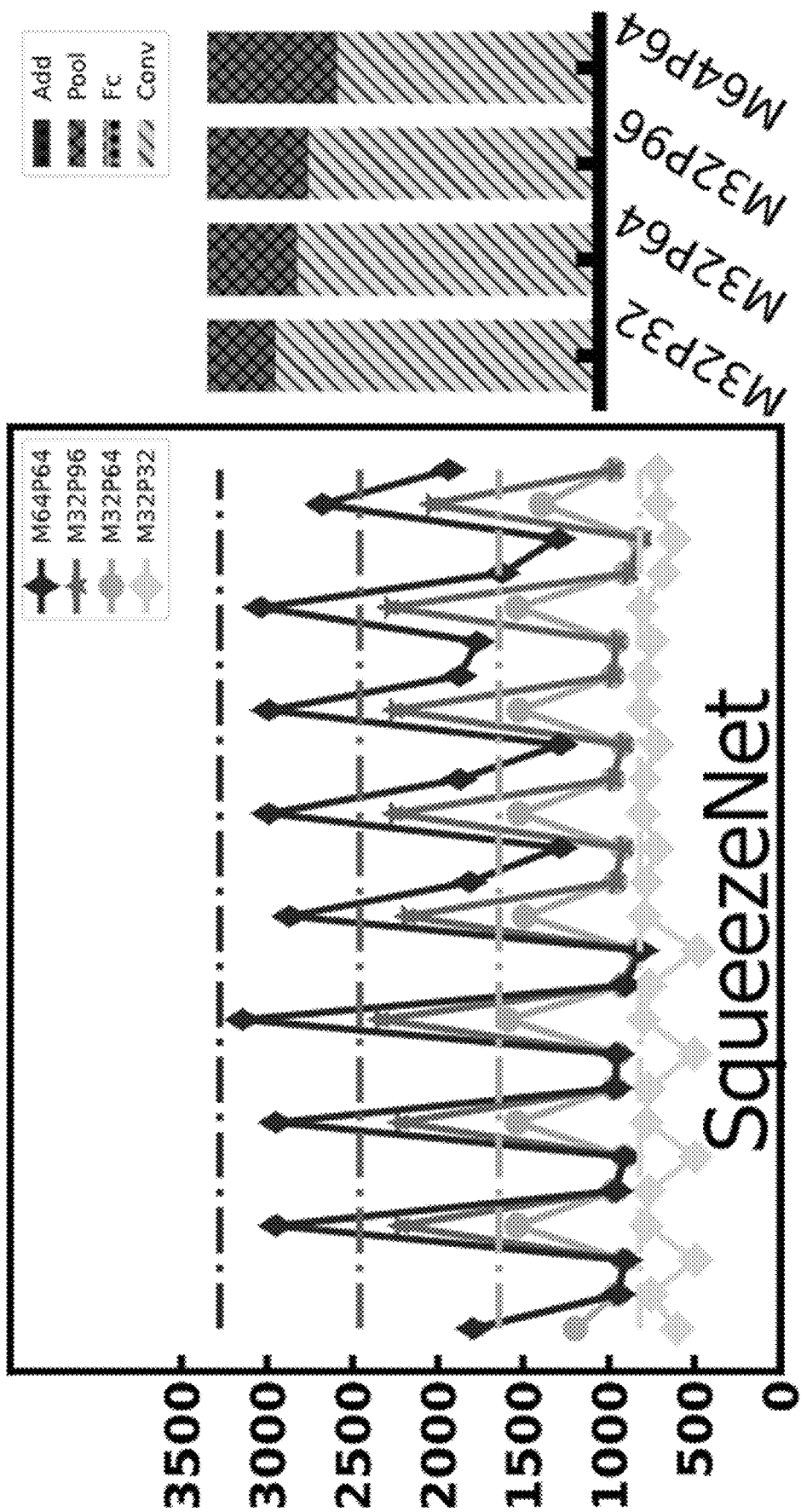
Figure 11D:
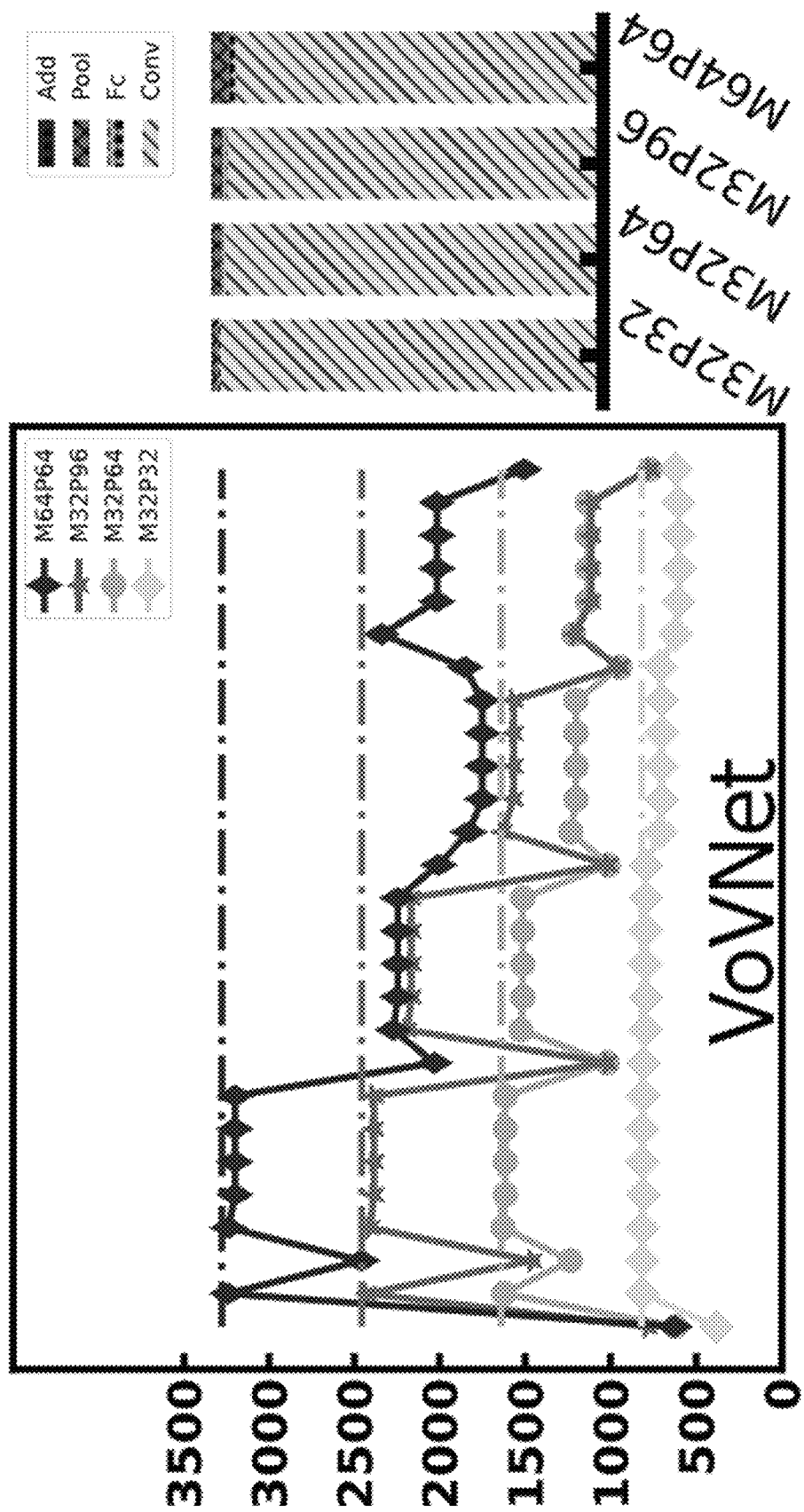
Figure 11E:
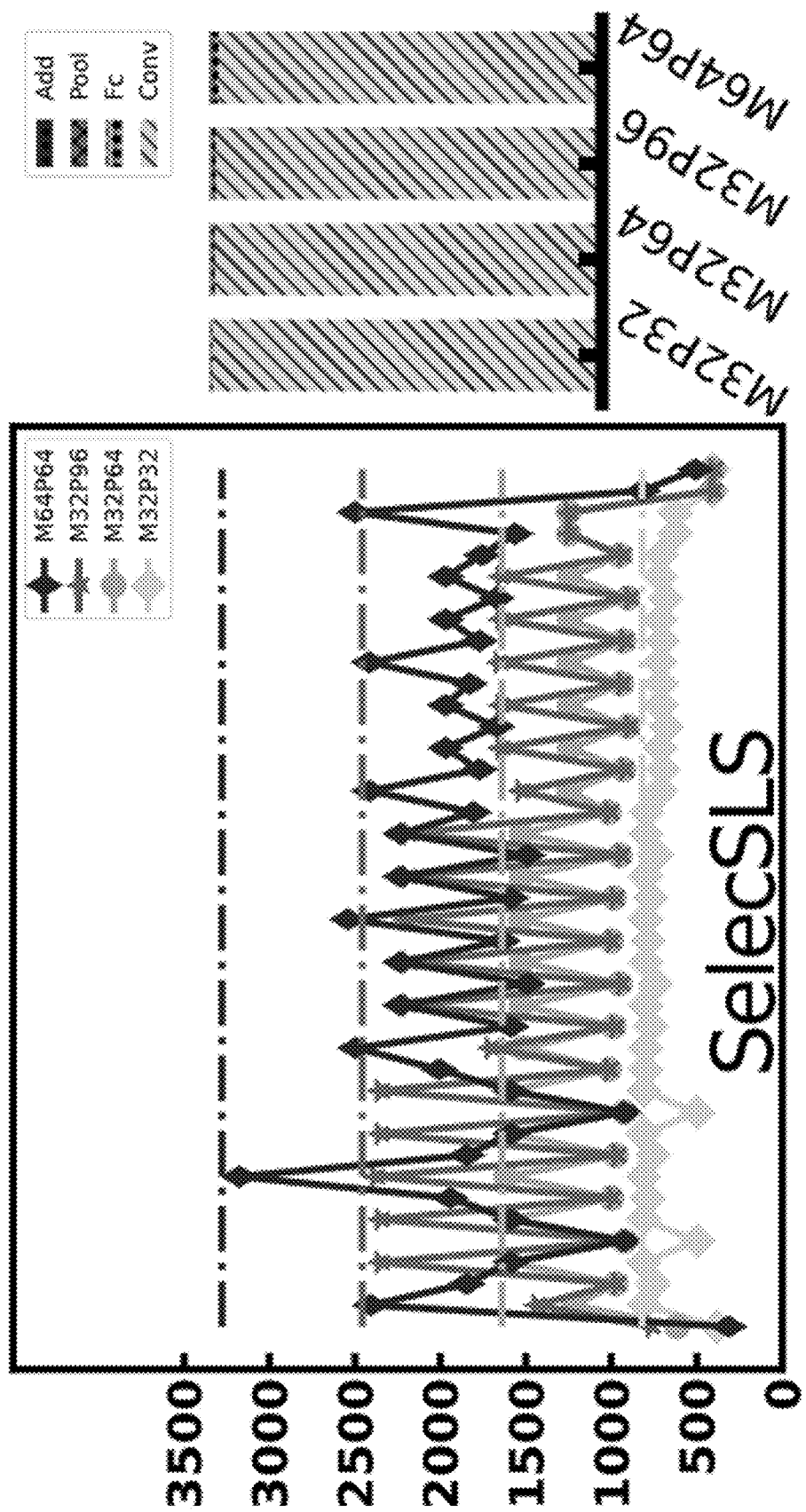
Figure 11F:
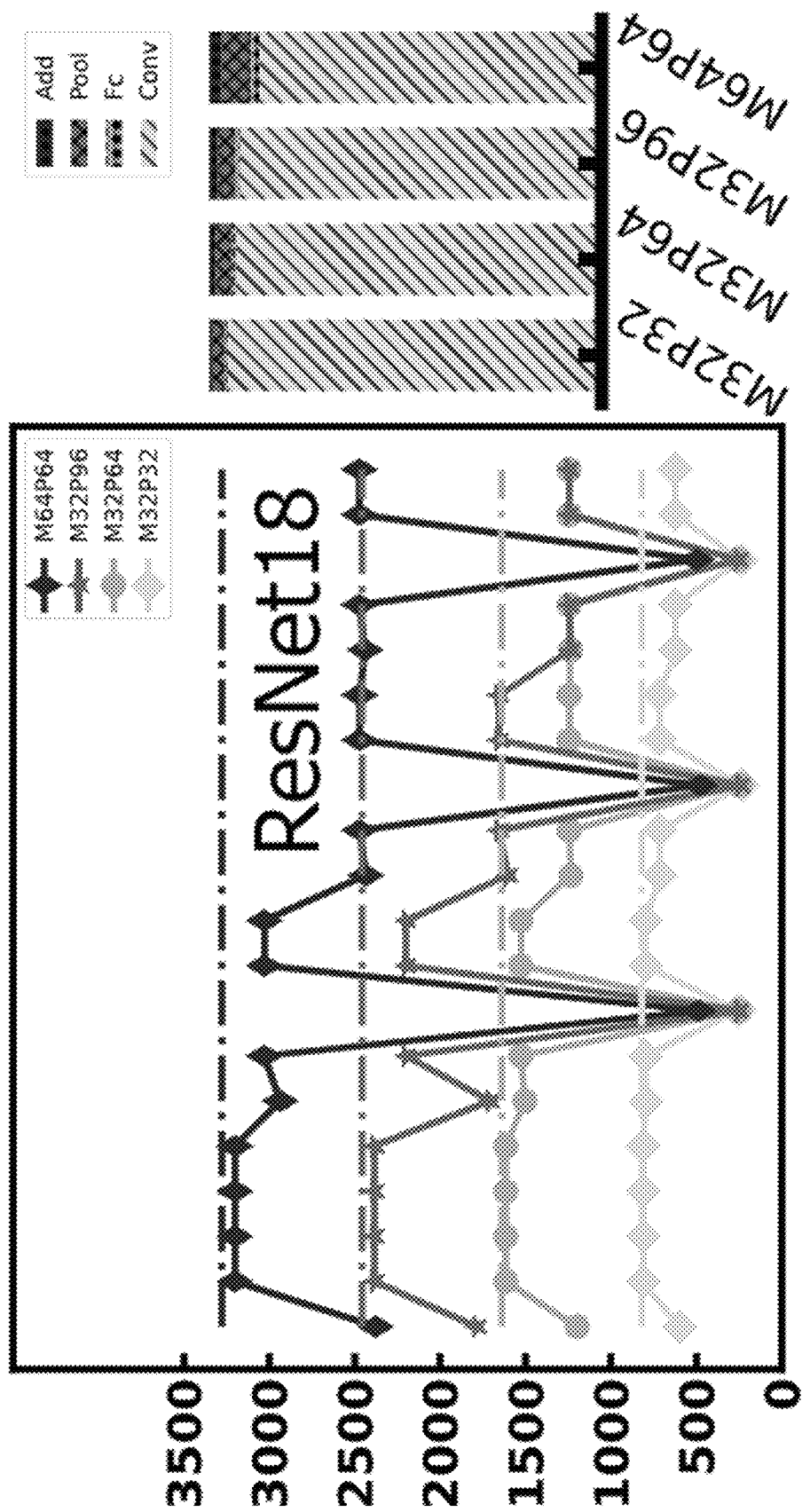
Figure 11G:
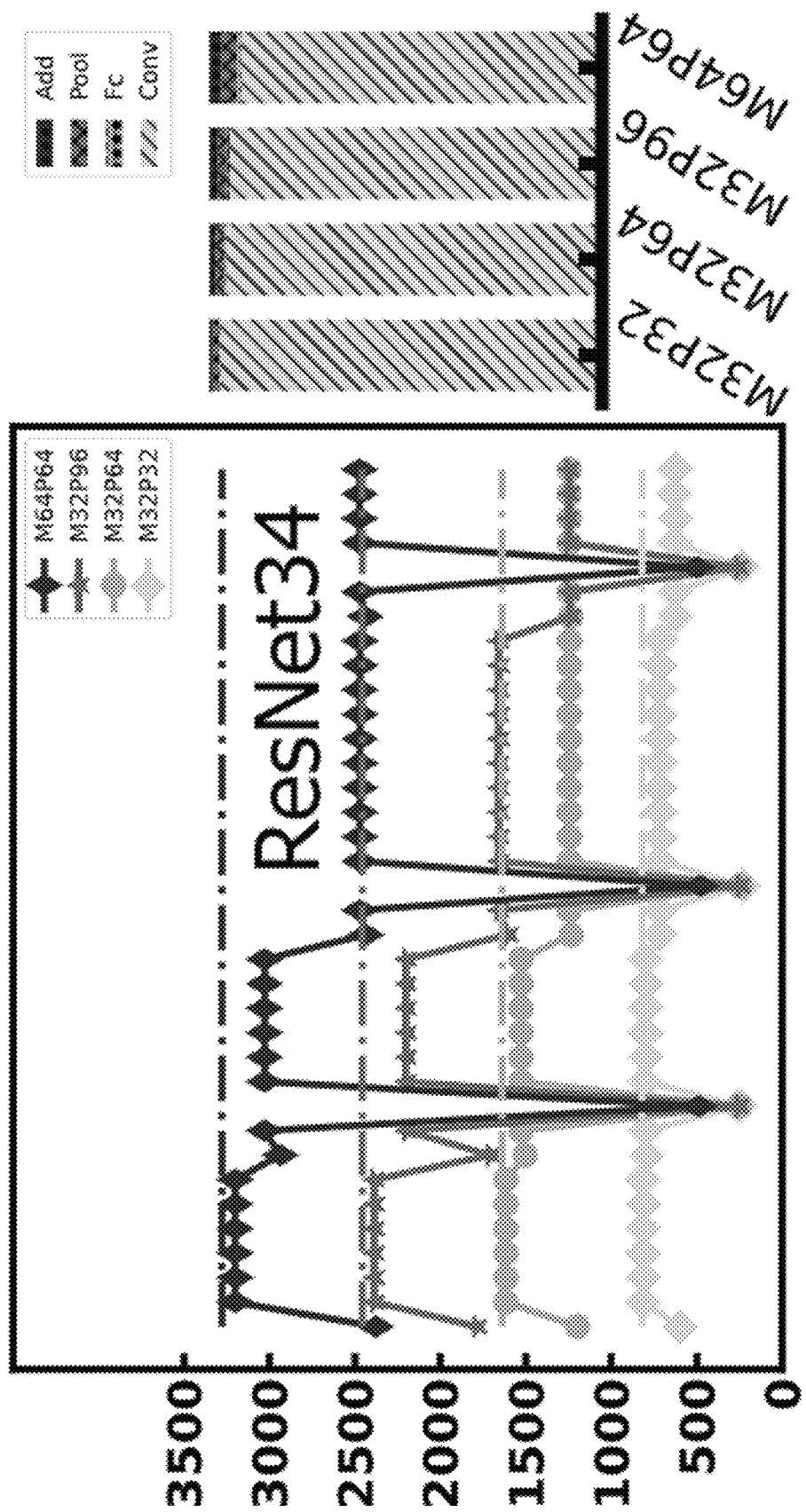
Figure 11H:
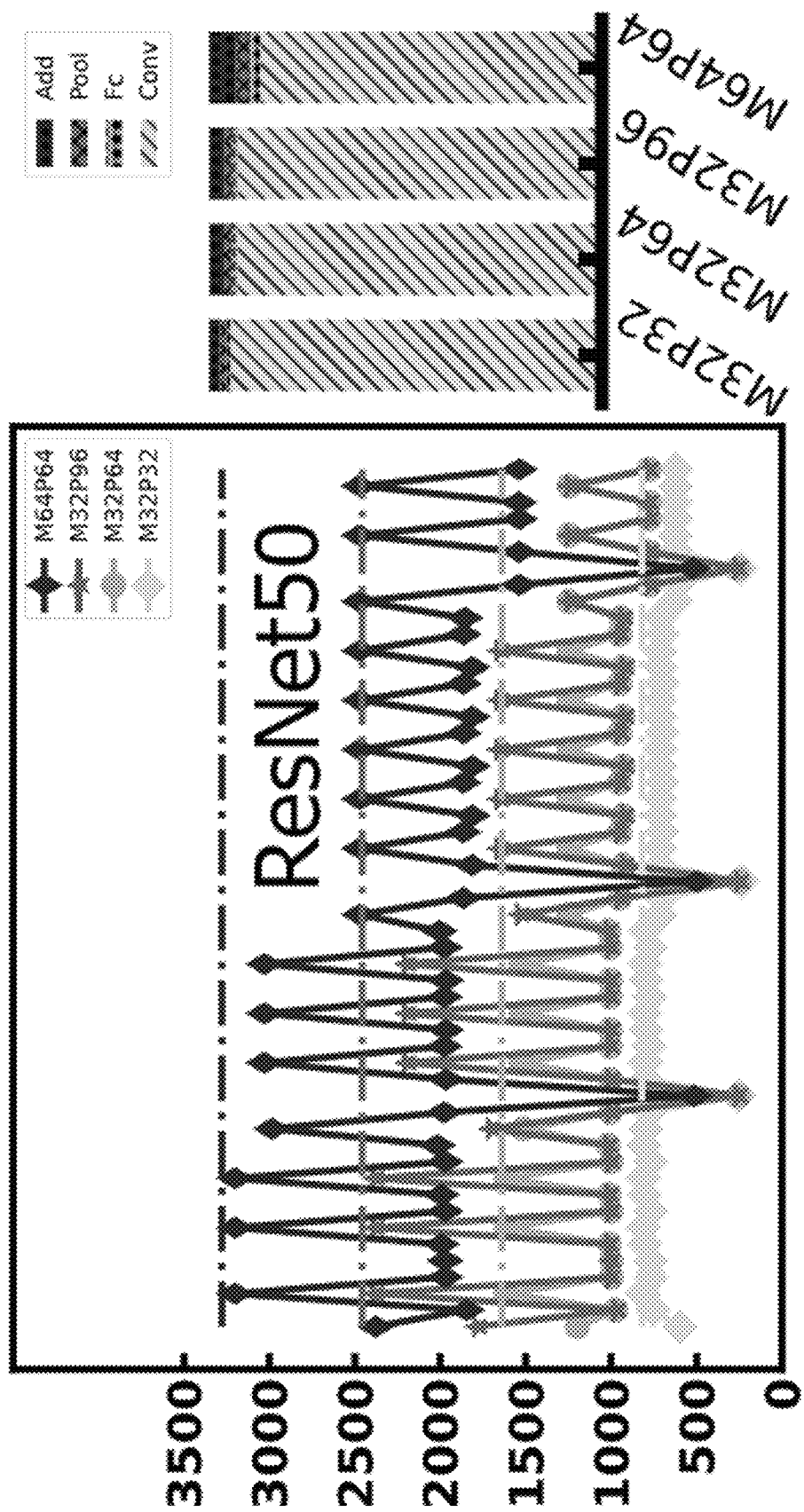
Figure 11I:
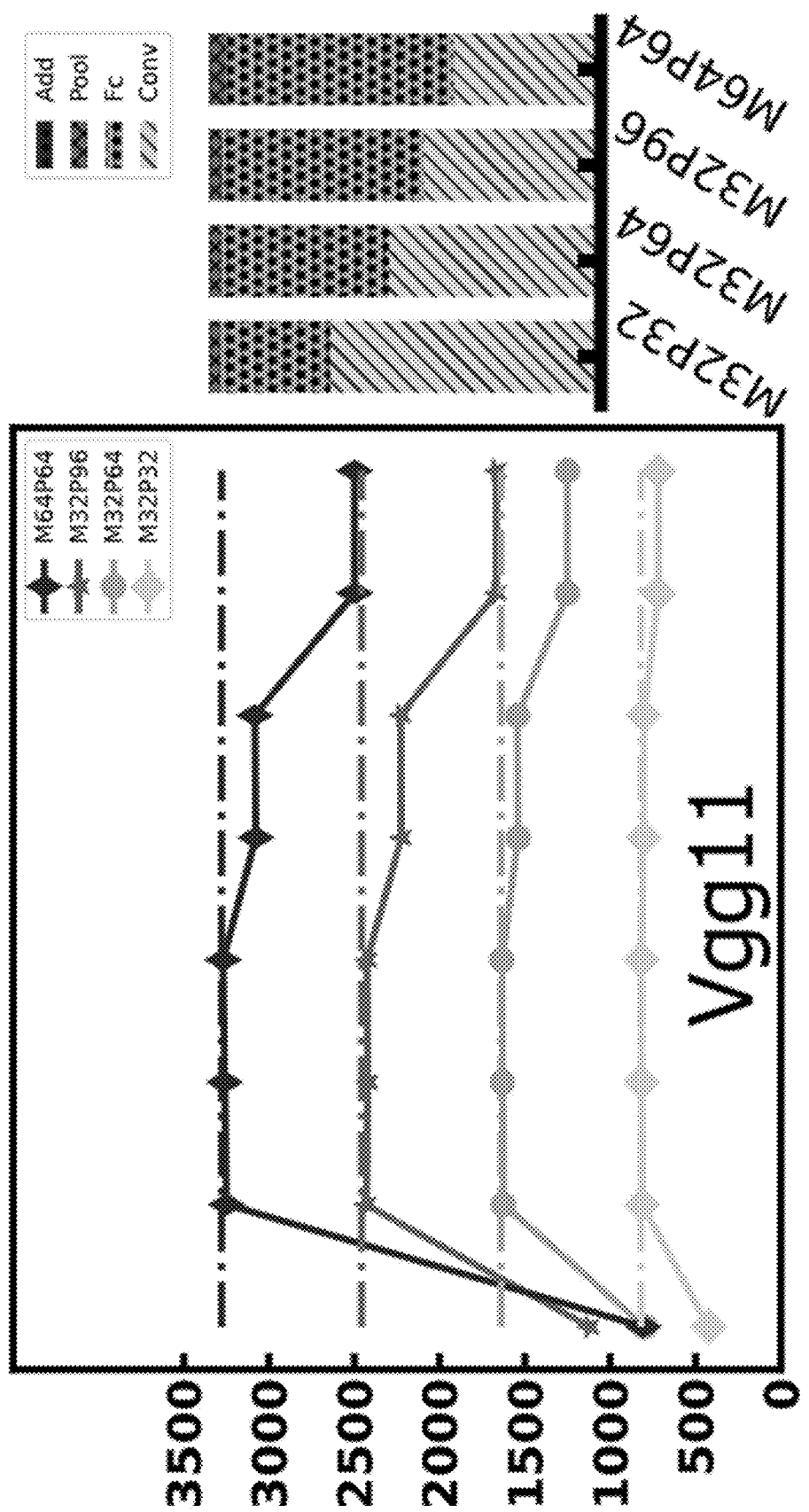
Figure 11J:
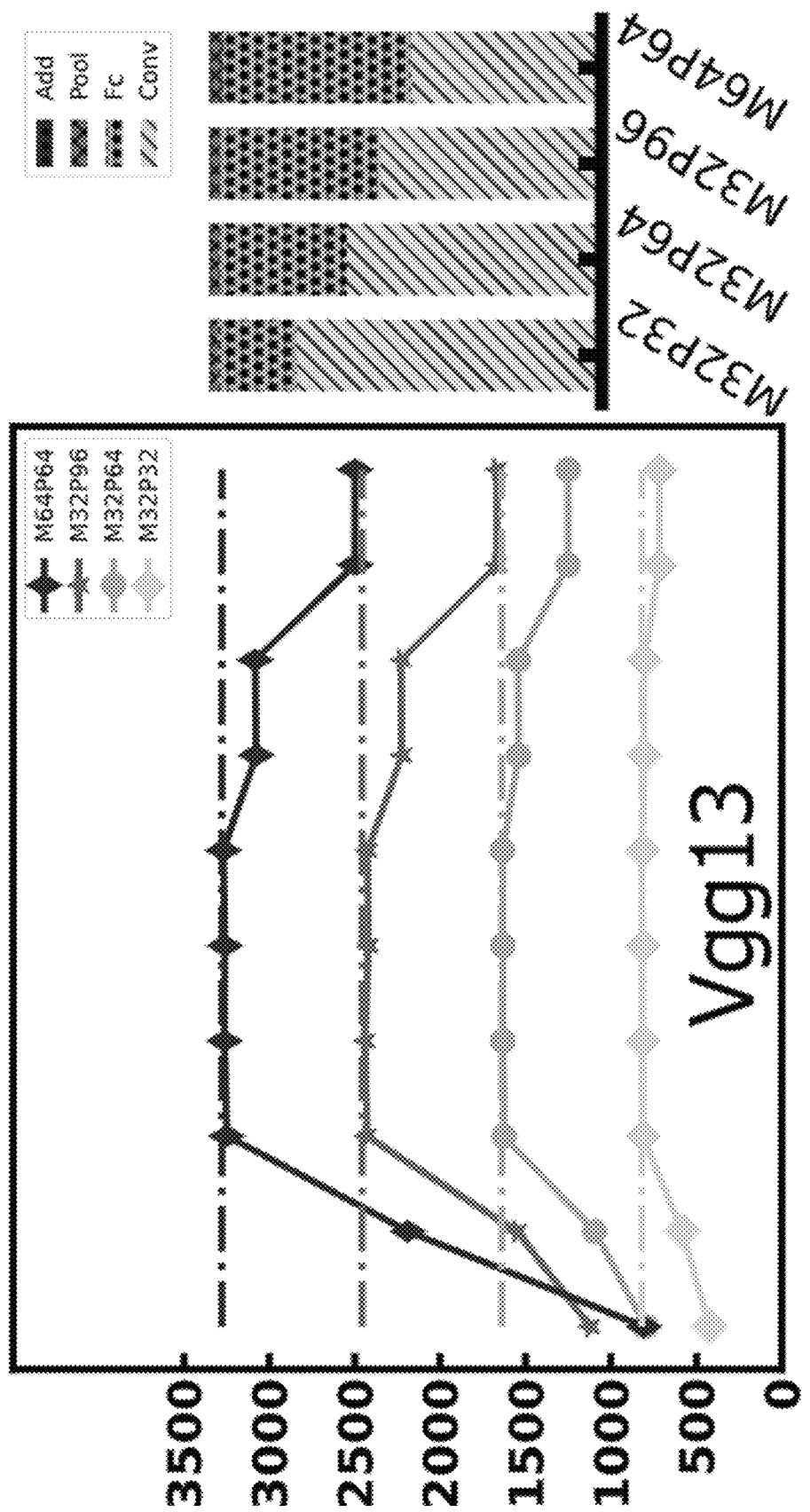
Figure 11K:
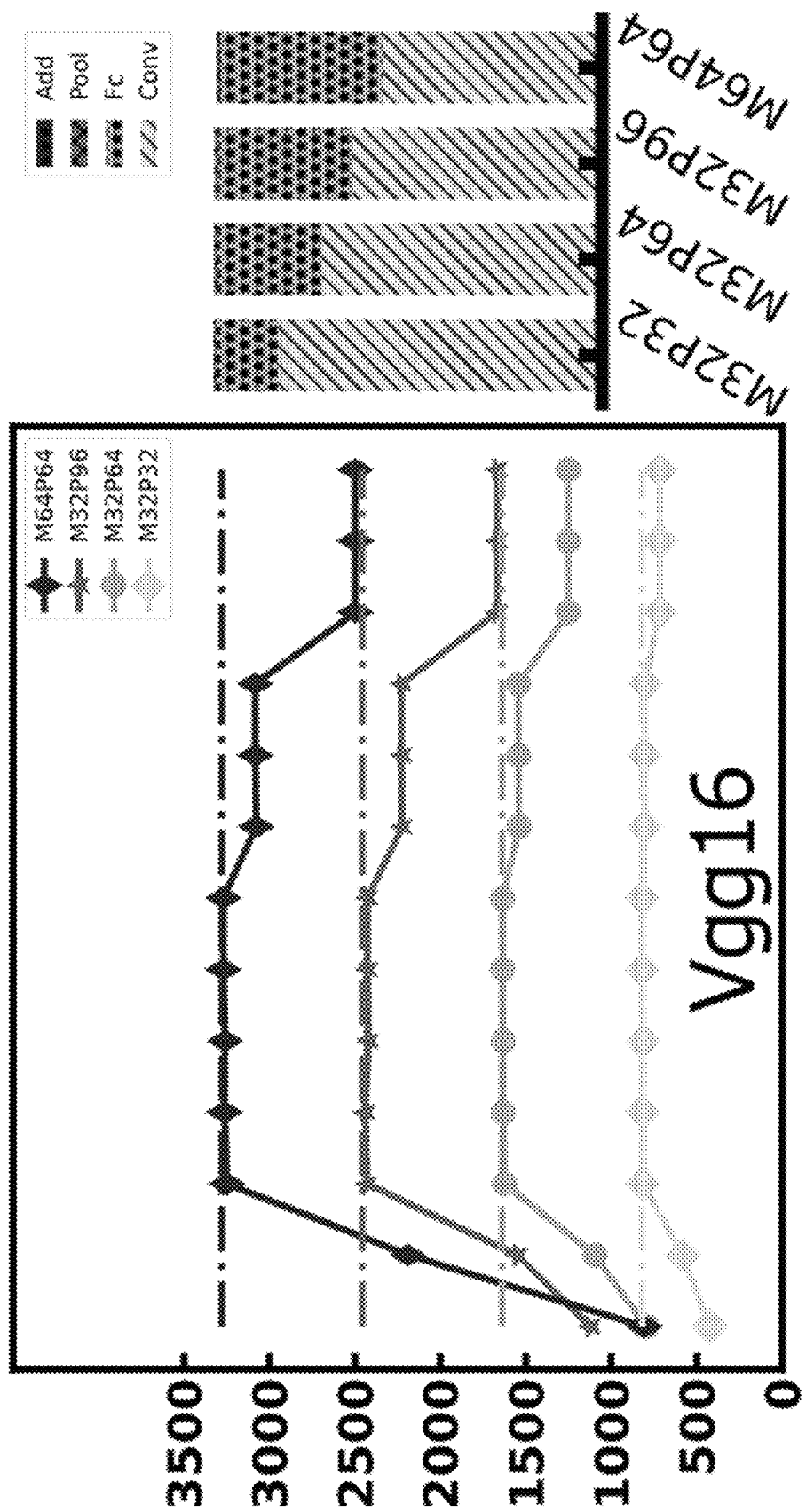
Figure 11L:
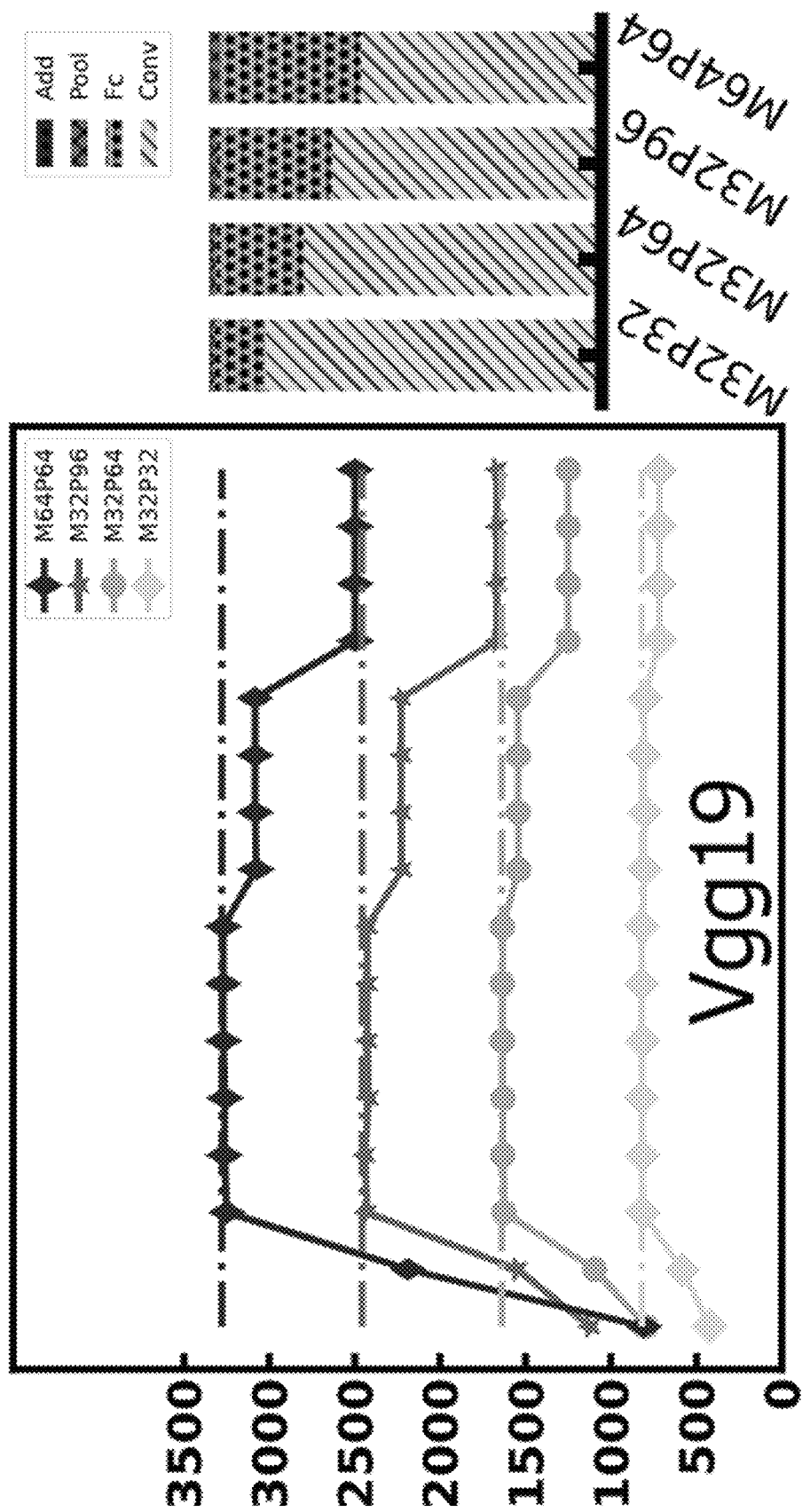

As shown in FIG. 10, FIG. 10 is a structure and data flow of the convolution engine in the embodiment of this invention. An adder is responsible for the addition of biases, and the corresponding PPU implements multiplication, shift, and addition operations after the dot product. If the Relu flag is set, the Relu operation will also be performed. Before writing back, 8-bit results need to be reordered to take advantage of RTM's high bandwidth and multi-channel writing characteristics.

The pooled PE consists of a comparator and an accumulator, corresponding to MaxPool and AveragePool instructions, respectively. 4P PEs are instantiated, and each PE processes a column vector. The operation of PE in Add is also designed as a pipeline. Since each clock cycle can read up to 128 pixels from the RTM, the embodiment of this invention instantiates 128 PEs to take advantage of all memory bandwidth. In the FC engine, the embodiment of this invention uses 64 PEs to take full advantage of DRAM bandwidth, where Each PE corresponds to an output pixel.

2. Experimental Verification
1) Experimental Device

The compiler for the embodiment of this invention is developed based on Python 3.7 and the ONNX operator v9 version. All accelerators are described in Verilog, generated in Vivado2022.2, and evaluated on the VCU118 evaluation board of Xilinx. The clock frequencies of main_clk and sa_clk are set to 250 MHz and 400 MHz, respectively. Flow_PerfOptimized_high and Perfor-mance_Auto_1 are selected as the synthesis and implementation strategies to achieve timing convergence in the embodiment of this invention. Auto-pipeline technology is also applied to the cross-SLR optimization. Four accelerators are generated by modifying the design variables, namely M32P32, M32P64, M32P96, and M64P64, respectively, where MyPz represents the accelerator with a systolic array of y rows and z columns.

TABLE 2

Resource Utilization Rate

|  | LUT | BRAM | URAM | DSP |
|---|---|---|---|---|
| M32P32 | 251442 (21%) | 489 (22%) | 946 (98%) | 1219 (17%) |
| M32P64 | 338712 (28%) | 761 (35%) | 946 (98%) | 2243 (32%) |
| M32P96 | 428189 (36%) | 1044 (48%) | 946 (98%) | 3331 (48%) |
| M64P64 | 411654 (34%) | 761 (35%) | 952 (99%) | 4291 (62%) |

The embodiment of this invention compiles and accelerates 12 pre-trained CNN models converted from the PyTorch version to evaluate the performance and flexibility of the designed tool flow and hardware architecture. AlexNet and ZFNet are used to test convolution operations with irregular convolution kernels, such as 11×11, 7×7, and 5×5; use SqueezeNet 1.0 to test the Concat operator. The Add operator is evaluated by using three ResNet type models, namely ResNet18, ResNet34, and ResNet50; dense-Block is evaluated by using VoVNet-27-slim and SelecSLS-42b. In addition, four Vgg models are used to observe the performance under ultra-massive computations.

2) Convolution Layer Performance

As shown in FIGS. 11A-11L, FIGS. 11A-11L show the throughput of M32P32, M32P64, M32P96, and M64P64 convolutional layers in the embodiment of this invention. The peak (ideal) throughputs of M32P32, M32P64, M32P96, and M64P64 are 819.2, 1638.4, 2457.6, and 3276.8 GOPS, respectively. Taking M32P32 as an example, it is found that the throughputs of most convolutional layers are close to the peak in the embodiment of this invention. The Conv_12 of Vgg16 reaches the highest throughput of 817.64 GOPS, which is 99.81% of the peak.

The embodiment of this invention summarizes the reasons for high performance as follows:

1. The MACC unit in the systolic array can be completely pipelined.
2. The X-bus can take advantage of data reuse and provide sufficient $M_x$ bandwidth.
3. The bandwidth design of CWM meets the requirements of the convolution engine, and the double pointer mechanism helps to eliminate the DRAM access delay of dynamic weights.

However, some layers also show relatively poor performance. For the first layer, the INC(=3) is aligned to 4 to meet the X-bus requirements, which means that at least 25% of the operations performed in the systolic array are invalid. For the last few layers, the output feature map size is very small and P cannot be matched well, resulting in idle PE columns when processing the final X_blk. Layers with 1×1 convolution kernels (for example, in ResNet18, ResNet34, and ResNet50) also show lower throughput. This is because pixels are not reused in these layers, which does not match the design purpose of the X-bus.

M32P64, M32P96, and M64P64 have 2×, 3×, and 4× MACC units respectively compared with M32P32, so these accelerators can achieve higher throughput. For computationally intensive layers, such as the middle layer of the Vgg model, most layers of AlexNet and ZFNet, and the first few layers of ResNet18 and ResNet34, the performance improvement is almost the same as that of the MACC unit.

3) End-to-End Performance

The embodiment of this invention counts the inference delay L (ms) and the total throughput T (GOPS) to evaluate the end-to-end performance. The computational density D (GOPS/DSP, defined as the total throughput divided by the number of DSPs used to implement the MACC unit) is also used as an evaluation index for comparison with related work. The specific results are shown in Table 3.

TABLE 3

End-to-end performance of M32P32, M32P64, M32P96 and M64P64 on 12 CNN models

|  | M32P32 | | | M32P64 | | | M32P96 | | | M64P64 | | |
|---|---|---|---|---|---|---|---|---|---|---|---|---|
| Model | L | T | D | L | T | D | L | T | D | L | T | D |
| AlexNet | 5.51 | 259.35 | 0.25 | 4.62. | 309.36 | 0.15 | 4.31 | 331.15 | 0.11 | 4.17 | 342.99 | 0.08 |
| ZFNet | 12.9 | 384.73 | 0.38 | 9.5 | 521.42 | 0.25 | 8.41 | 589.08 | 0.19 | 7.9 | 627.31 | 0.15 |
| SqueezeNet | 12.8 | 594.08 | 0.58 | 1.75 | 965.4 | 0.47 | 1.44 | 1173.6 | 0.38 | 1.21 | 1394.6 | 0.34 |
| VoVNet-27-slim | 5.83 | 765.92 | 0.75 | 3.39 | 1317.8 | 0.64 | 2.69 | 1662.8 | 0.54 | 1.9 | 2347.4 | 0.57 |
| SelecSLS-42b | 9.22 | 682.98 | 0.67 | 5.74 | 1097.3 | 0.54 | 5.09 | 1237.1 | 0.4 | 3.52 | 1788 | 0.44 |
| ResNet18 | 5.38 | 674.01 | 0.66 | 2.96 | 1227 | 0.6 | 2.39 | 1519.5 | 0.49 | 1.59 | 2275.7 | 0.56 |
| ResNet34 | 10.5 | 698.85 | 0.68 | 5.75 | 1275.1 | 0.62 | 4.53 | 1616.1 | 0.53 | 3.02 | 2424.7 | 0.59 |
| ResNet50 | 13.7 | 597.06 | 0.58 | 9.85 | 830.26 | 0.41 | 9.22 | 887.11 | 0.29 | 5.32 | 1538.4 | 0.38 |
| Vgg11 | 27.5 | 553.17 | 0.54 | 18.2 | 838.14 | 0.41 | 15.1 | 1010.1 | 0.33 | 13.4 | 1139.7 | 0.28 |
| Vgg13 | 38.4 | 588.94 | 0.58 | 23.8 | 950.15 | 0.46 | 19 | 1192.3 | 0.39 | 16.2 | 1398 | 0.34 |
| Vgg16 | 48.8 | 633.61 | 0.62 | 29.2 | 1059.4 | 0.52 | 22.7 | 1362.4 | 0.44 | 18.9 | 1638.8 | 0.4 |
| Vgg19 | 59.3 | 662.56 | 0.65 | 34.6 | 1134.6 | 0.55 | 26. | 1484.4 | 0.48 | 21.6 | 1819.2 | 0.44 |

The network architecture of the model has a great impact on the end-to-end performance. The model without the FC layer can achieve relatively higher overall throughput. The reason is that the weight of the FC layer is stored in the DRAM and loaded when operating. Although the DRAM bandwidth (16GiB/s) meets the requirements of the systolic array, it limits the parallelism of the FC engine and becomes the main reason for the performance bottleneck.

Taking M32P32 as an example, the throughput of AlexNet is 259.35 GOPS (31.65% of the peak) because the FC layer consumes about 66.68% of the execution time. In contrast, VoVNet and ResNet34 are not limited by the FC layer, so they can maintain high performance. Recent CNN models have replaced the FC layer with the GlobalAveragePool layer, and even directly removed it without losing accuracy. This is the reason why this application does not further optimize the FC engine. Thanks to the deep pipeline hardware architecture, the embodiment of this invention achieves an overall throughput of up to 765.92 GOPS on M32P32 when accelerating VoVNet, which is 93.50% of the peak throughput.

On the other hand, increasing the number of PEs can also improve the end-to-end performance. Although the performance improvement is nonlinearly related to the size of PE, the throughput improvement of most models on M32P96 is still more than 2 times higher than that of M32P32. In addition, the embodiment of this invention achieves a total throughput of up to 2424.73 GOPS and a convolution throughput of up to 3267.61 GOPS (99.72% of the peak throughput) on M64P64.

4) Comparison with Related Work

At present, many studies have been published on the automatic mapping of CNN models to FPGAs. The embodiment of this invention focuses on the flexibility of the compiler software and the end-to-end performance of the target accelerator. Table 4 shows the detailed comparison results.

A full-stack compiler supporting multiple deep learning frameworks is designed in Comparison case 1. They moved the restricted and memory-accessed FC layer to the CPU to improve overall throughput, so their accelerators performed better on Vgg16 than that of the embodiment of this invention. However, the ResNet50 in the embodiment of this invention is still superior to theirs, although their accelerator runs at 500 MHz. In order to achieve the high performance of a specific model, a parameterized RTL module is developed in Comparison case 2 for each type of operation, and is automatically integrated with the help of the compiler. However, updating the target model requires re-implementation and reconfiguration of the FPGA, and the quantization tool is not integrated into the tool chain. The number of MACC units is similar to the M32P96 of the embodiment of this invention. The results show that the embodiment of this invention achieves higher throughput and computational density. A custom ISA and overlay are designed in Comparison case 3, and TensorFlow is used as the front end of their compiler. The results show that the data reuse strategy relies on broadcast, which may lead to large fanouts and cause timing convergence problems. The embodiment of this invention lists the performance of OPU1024 with the same number of MACC units as M32P32. Due to the higher clock frequency, the embodiment of this invention achieves higher throughput. However, the computational density of the embodiment of this invention is low, because they package two 8-bit multiplication operations into a DSP without using accumulator registers.

The technical solutions in Comparison case 4 and Comparison case 5 are evaluated on the same FPGA chip as the embodiment of this invention, and the DSP utilization rate of Comparison case 4 is similar to M32P64 of the embodiment of this invention. Due to the efficient memory management algorithm, the embodiment of this invention achieves higher throughput and computational density.

In Comparison case 6, the activation values are saved as 5-bit data, and the weights are pre-trained as 4-bit and 8-bit for better performance. Nevertheless, the performance of M32P64 on ResNet18 is still better than the accelerator of related technical solutions. Compared with Comparison case 7, the embodiment of this invention on M32P32 of ResNet34 also achieved better performance.

In summary, compared with the existing technology, the tool flow of the embodiment of this invention is more flexible, and the accelerator of the embodiment of this invention achieves better or equivalent performance under the same DSP utilization rate.

The above embodiment of this invention is described in detail, but the content is only a better embodiment of this application and cannot be considered to limit the scope of

TABLE 4

| | End-to-end performance of related accelerators | | | | | | | | | |
|---|---|---|---|---|---|---|---|---|---|---|
| | Comparison case 1 | Comparison case 3 | Comparison case 2 | Comparison case 2 | Comparison case 3 | Comparison case 3 | Comparison case 4 | Comparison case 5 | Comparison case 6 | Comparison case 7 |
| Device | ZU9 | ZU9 | Arria10 | Arria10 | XC7K32ST | XC7K325T | VU9P | VU9P | ZCU102 | ZYNQ7045 |
| Model | Vgg16 | ResNet50 | Vgg16 | ResNet50 | Vgg16 | ResNet50 | Vgg16 | ResNet50 | ResNet18 | ResNet34 |
| Precision | 8-bit | 8-bit | 8/16-bit | 16-bit | 8-bit | 8-bit | 14-bit | 16-bit | Mixed | 16-bit |
| Throughput | 1780 | 680 | 968.03 | 599.61 | 354 | 346 | 779 | 1235.35 | 778.9 | 230.14 |
| #DSP | 1542 | 1542 | 3036 | 3036 | 516 | 516 | 2100 | 5349 | 2092 | 900 |
| Density | 1.15 | 0.44 | 0.32 | 0.2 | 0.67 | 0.67 | 0.38 | 0.23 | 0.37 | 0.26 | embodiments of this invention. All equal changes and improvements made by the scope of this application shall remain within the scope of protection of this invention.

What is claimed is:

1. A compiler system for deploying CNN models to FPGA-based high-performance accelerators, comprising a compiler front end and a compiler back end, as well as an FPGA-based runtime library and an accelerator;

the compiler front end is used for a quantization of CNN models to be deployed based on an ONNX model and a training data set, and an IR Graph corresponding to the CNN model to be deployed is obtained;

the compiler back end is used to determine instructions and configuration information corresponding to the CNN model to be deployed according to the IR Graph, and the instructions and configuration information are saved to hex files;

an instruction set architecture comprises CONV, MAXP, AVGP, ADD and FC, and the configuration information comprises pre-trained weights and bias, packet descriptors and key-value pairs representing control registers;

the runtime library is used to store instructions and configuration files to DRAM, and FPGA is configured according to the configuration information of the model;

a convolution engine uses an im2col algorithm to transform convolution operations into matrix multiplications, and uses a fully-pipelined systolic array to accelerate these multiplications;

the compiler back end comprises an instruction generation unit and a static data determination unit;

the instruction generation unit takes as input the quantized model from the front end and is used to generate instruction sequence for different accelerator configurations;

the static data determination unit is used to determine static data for the accelerator according to the quantized model and deserialize to files with hex format;

the static data comprises pre-trained weight and bias tensors, the packet descriptors, and instruction sequences;

an on-chip buffers comprise RTM, CWM, BM, IM, and XPHM;

the RTM is used to store three-dimensional activation tensors for convolution and pooling operations, and one-dimensional vectors for fully-connected layers;

the CWM is used to store weight tensors for convolution operations;

the BM is used to store the bias for both convolutional layers and fully-connected layers;

the IM is used to store the instructions corresponding to the CNN model to be deployed;

the XPHM is used to store packet descriptors for convolutional and pooling layers;

the RTM comprises four independent storage blocks, each of which has a data bit width of 256 bits and can store 32 pixels with int8 precision;

the RTM has two storage mode, T-mode and V-mode, with the T-mode for storing three-dimensional tensors and the V-mode for one-dimensional vectors;

when the three-dimensional tensor needs to be stored in T-mode, placing a two-dimensional feature map in each storage block in sequence according to a channel order; for the two-dimensional feature map, after the pixels of the two-dimensional feature map are expanded into one-dimensional vectors, and arranging one-dimensional vectors in the corresponding storage blocks in turn, if a number of tensor channels of the two-dimensional feature map is not a multiple of 4, the compiler will automatically fill the number of tensor channels to a multiple of 4;

when the one-dimensional vector needs to be stored in the V-mode, elements of the vector are divided into segments and stored in RTM in turn, each segment contains 64 pixels and occupies two storage blocks; if a vector length of the one-dimensional vector is not a multiple of 64, the compiler will automatically fill the pixels to a multiple of 64.

2. The compiler system for deploying CNN models to FPGA-based high-performance accelerators according to claim 1, wherein the compiler front end comprises a quantization parameter calculation unit and a quantization parameter verification unit;

the quantization parameter calculation unit is used to calculate quantization parameters for each layer of an input ONNX model, and parameters are determined by analyzing value ranges of weight and activation tensors that are obtained by running a batch of inference tasks on the training data set;

the quantization parameter verification unit is used to evaluate an accuracy of a quantized model by simulating hardware behaviors on CPUs, and the verification unit will iteratively optimize quantization parameters to meet a preset accuracy;

the quantization parameter calculation unit is also used to construct the IR Graph in the way of modifying an ONNX calculation diagram according to the quantization parameters.

3. The compiler system for deploying CNN models to FPGA-based high-performance accelerators according to claim 1, wherein the CWM comprises a static segment storage area and a dynamic segment storage area with adjacent settings;

the static segment storage area is used to store the weight tensors that are pre-loaded before running inference;

the dynamic segment storage area is used to cache weight tensors that are loaded from DRAM during the inference;

moreover, the dynamic segment storage area controls an access to the dynamic segment storage area through a double pointer mechanism;

a dynamic segment rd_ptr represents an address of a next expected data;

a dynamic segment wr_ptr represents a maximum address of a current valid data, the dynamic segment wr_ptr moves to a low address of the dynamic segment storage after configuring the static segment storage area or at a beginning of a convolution instruction, the dynamic segment wr_ptr will be updated when the convolution weight arrives;

if an entry of the dynamic segment storage area needs to be read, it should be satisfied that the dynamic segment wr_ptr is greater than the dynamic segment rd_ptr.

4. The compiler system for deploying CNN models to FPGA-based high-performance accelerators according to claim 1, wherein a scalable hardware module, X-bus is also developed to implement an im2col algorithm on-chip;

the X-bus comprises a packet generator and several filters;

the packet generator is used to read the three-dimensional tensor from the RTM and recombine the three-dimensional tensor into a virtual feature map matrix with a column vector of length Q, and organize pixel data in the virtual feature map matrix into data packets;

each data packet is composed of a packet descriptor and several payloads;

the packet descriptor contains four fields, comprising X_a_, len_per_chan, win_x, and win_y; where X_a_ and len_per_chan are a starting address and a length of the data packet in a virtual feature map, respectively, and win_x and win_y are positions of a sliding window corresponding to the data packet;

the payloads carry the pixel data and follow the packet descriptor;

the filters receive and cache data packets, and set Command Z, Command X, and Command E to describe a behavior of caching access, and use a cache read pointer rd_ptr to describe a current access state;

Command Z has no operands, it represents four zero elements, which can be processed directly without reading the cache;

Command X is used to indicate a reading of four pixels, the operands comprise shift and b_, shift represents a number of steps that need to be moved to locate an entry of rd_ptr where data in the cache is located, and b_ represents an address offset of the data in the entry;

Command E is used to end an access to a current packet and move rd_ptr to a next packet header.

5. The compiler system for deploying CNN models to FPGA-based high-performance accelerators according to claim 4, wherein a fully-pipelined systolic array is connected to an FSM of the X-bus through FIFO to realize a back pressure mechanism;

each filter provides a stall_req signal to the packet generator, when any stall_req signal is raised, the packet generator will stop a current transmission by placing invalid entries on the X-bus until no stop request asserted.

6. The compiler system for deploying CNN models to FPGA-based high-performance accelerators according to claim 5, wherein a convolution engine also comprises a synchronizer;

the synchronizer is used to deal with a synchronization relationship of the fully-pipelined systolic array;

a feature map row vector and a convolution weight column vector of the systolic array are from XFIFO and WFIFO, respectively, a row vector of XFIFO is written by FSM;

after a decoding of an instruction is completed, the engine starts to read the weight column vector immediately by a processor from the CWM and writing it to WFIFO, if a required weight entry has not been loaded into the CWM, the process will be blocked, the process will continue to execute until the required weight entry is loaded;

in each clock cycle, if the row vector and the column vector in XFIFO and WFIFO already exist, the synchronizer will read the row vector and the column vector simultaneously and provide them to the systolic array, otherwise the synchronizer will provide a 0 vector for the systolic array;

in a backpressure mechanism, outputs from the systolic array are buffered in a YFIFO, and a feedback signal will be sent to the synchronizer when the YFIFO is going to be full, which causes the synchronizer to stop reading input vectors from XFIFO and WFIFO and send 0 vectors to the systolic array.

7. The compiler system for deploying CNN models to FPGA-based high-performance accelerators according to claim 5, wherein the system uses a high-speed fully-pipelined systolic array of M rows and P columns to accelerate matrix multiplications and reduces a number of duty cycles through workload scheduling, vector reordering, and asynchronous processing;

workload scheduling: a matrix multiplication $M_x$ $M_w$ obtained by an im2col transformation of convolution is divided into small workloads; in a process of the workload scheduling, first, fixing a $M_x$ submatrix, traversing all $M_w$ submatrices, and then processing the next $M_x$ submatrix until all processing is completed;

vector reordering: storage format of tensors in RTM ensures that pixels at the same position in four consecutive channels can be read at the same time, so vector reordering with four channels as a group can provide 4 times a bandwidth of non-reordering;

asynchronous processing: the systolic array can run at a higher frequency than logic processing modules; clock frequencies of X-bus and the systolic array are set to 250 MHz and 400 MHz, respectively.

8. The compiler system for deploying CNN models to FPGA-based high-performance accelerators according to claim 7, wherein a processing element of the systolic array comprises a multiply-and-accumulate unit and a flush unit;

the multiply-and-accumulate unit completes a multiplication calculation and an accumulation calculation in an inner product of the vector in each clock cycle, the calculation process is implemented by a DSP48E2 in the FPGA, and the multiply-and-accumulate unit can use all available pipelines in a DSP48E2 primitive;

the flush unit is used to output the inner product of the vector from the systolic array;

after a multiplication result of the last elements of two input vectors is accumulated to an accumulation register, the flush unit will be notified to take away an accumulation result in the next cycle, and according to a time interleaving feature of the systolic array, the M flush units in the same column form a shift register chain of length M to output all the accumulation results in this column.

* * * * *